(12) United States Patent
Kohtani et al.

(10) Patent No.: US 6,578,161 B1
(45) Date of Patent: Jun. 10, 2003

(54) COUNTING APPARATUS, COUNTING METHOD, AND COMPUTER READABLE STORAGE MEDIUM

(75) Inventors: Hideto Kohtani, Hachioji (JP); Tsuyoshi Muto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/390,649

(22) Filed: Sep. 7, 1999

(30) Foreign Application Priority Data

Sep. 8, 1998 (JP) ............................. 10-254160

(51) Int. Cl.$^7$ ................................. H02H 3/05
(52) U.S. Cl. .................... 714/52; 714/797; 714/819; 377/28
(58) Field of Search .................... 714/52, 797, 819; 377/28

(56) References Cited

U.S. PATENT DOCUMENTS 4,698,808 A    10/1987  Ishii ........................ 371/21
5,553,231 A  * 9/1996  Papenberg et al. ............ 714/5
5,828,602 A  * 10/1998 Wong ....................... 365/185.2

FOREIGN PATENT DOCUMENTS

| JP | 03-191616 | * 8/1991 | ................. 377/28 |
| JP | 03-221973 |   9/1991 | |
| JP | 03-236066 |  10/1991 | |
| JP | 07-093505 |   4/1995 | |

* cited by examiner

Primary Examiner—Robert Beausoliel
Assistant Examiner—Michael Maskulinski
(74) Attorney, Agent, or Firm—Fitzpatrick, Cella, Harper & Scinto

(57) ABSTRACT

A counting apparatus comprising an execution detection circuit for detecting the execution of a predetermined operation; plural memory circuits for commonly storing the information on the number of execution at each detection of the execution; a destruction detection circuit for detecting, at the storage of the information, whether the information stored in each memory circuit is destructed; and a correction circuit adapted, upon detection that the information of a memory circuit is destructed, to correct the destructed information with the information of another memory circuit.

7 Claims, 20 Drawing Sheets

CONNECTION DIAGRAM

FIG. 3

VIDEO I/F

| SIGNAL NAME | SHORT TITLE | SIGNAL DIRECTION |
|---|---|---|
| PRINTER POWER READY | /PPRDY | CONTROLLER ← PRINTER |
| CONTROLLER POWER READY | /CPRDY | CONTROLLER → PRINTER |
| READY | /RDY | CONTROLLER ← PRINTER |
| PRINT | /PRNT | CONTROLLER → PRINTER |
| TOP OF PAGE | /TOP | CONTROLLER ← PRINTER |
| LINE SYNCHRONOUS | /LSYNC | CONTROLLER ← PRINTER |
| VIDEO CLOCK | /VCLK | CONTROLLER → PRINTER |
| IMAGE ENABLE | /VDOEN | CONTROLLER → PRINTER |
| IMAGE | /VDO | CONTROLLER → PRINTER |
| CONTROLLER CLOCK | /CCLK | CONTROLLER → PRINTER |
| COMMAND BUSY | /CBSY | CONTROLLER → PRINTER |
| COMMAND | /CMD | CONTROLLER → PRINTER |
| STATUS BUSY | /SBSY | CONTROLLER ← PRINTER |
| STATUS | /STS | CONTROLLER ← PRINTER |
| PRINT POWER READY | /PFED | CONTROLLER ← PRINTER |
| SPEED CHANGE | /SPCHG | CONTROLLER ← PRINTER |
| SHEET DELIVERY | /PDLV | CONTROLLER ← PRINTER |
| SHEET FRONT EDGE | /TOPR | CONTROLLER ← PRINTER |
| STATUS CHANGE NOTICE | /CCRT | CONTROLLER ← PRINTER |

IMAGE SIGNAL TIMING CHART

SERIAL COMMUNICATION TIMING CHART

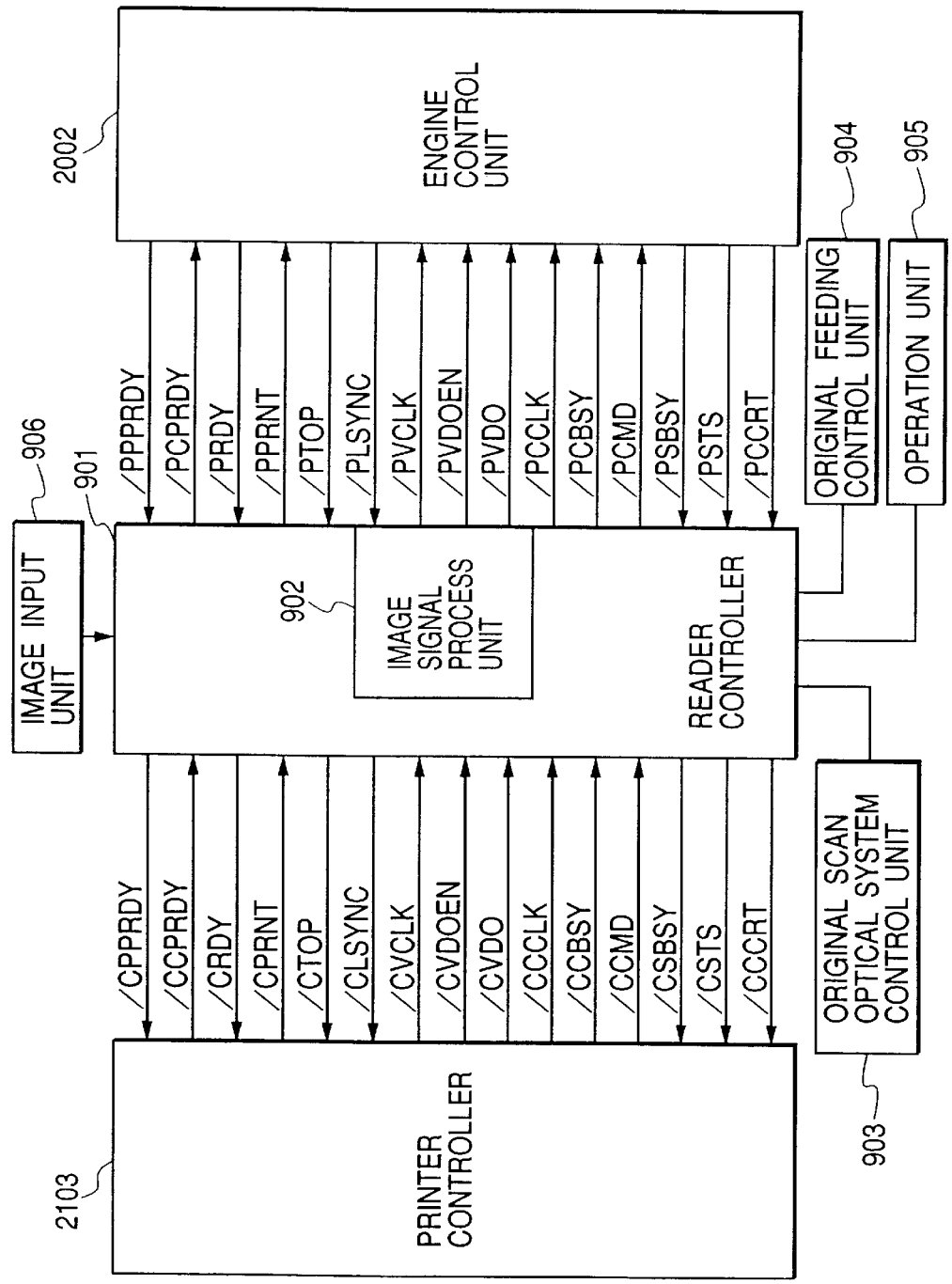

PRINTER CONTROLLER

ENGINE CONTROL UNIT

OF INTERRUPT COPYING

GENERAL CONFIGURATION DIAGRAM

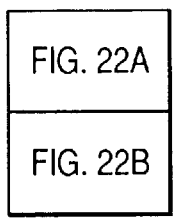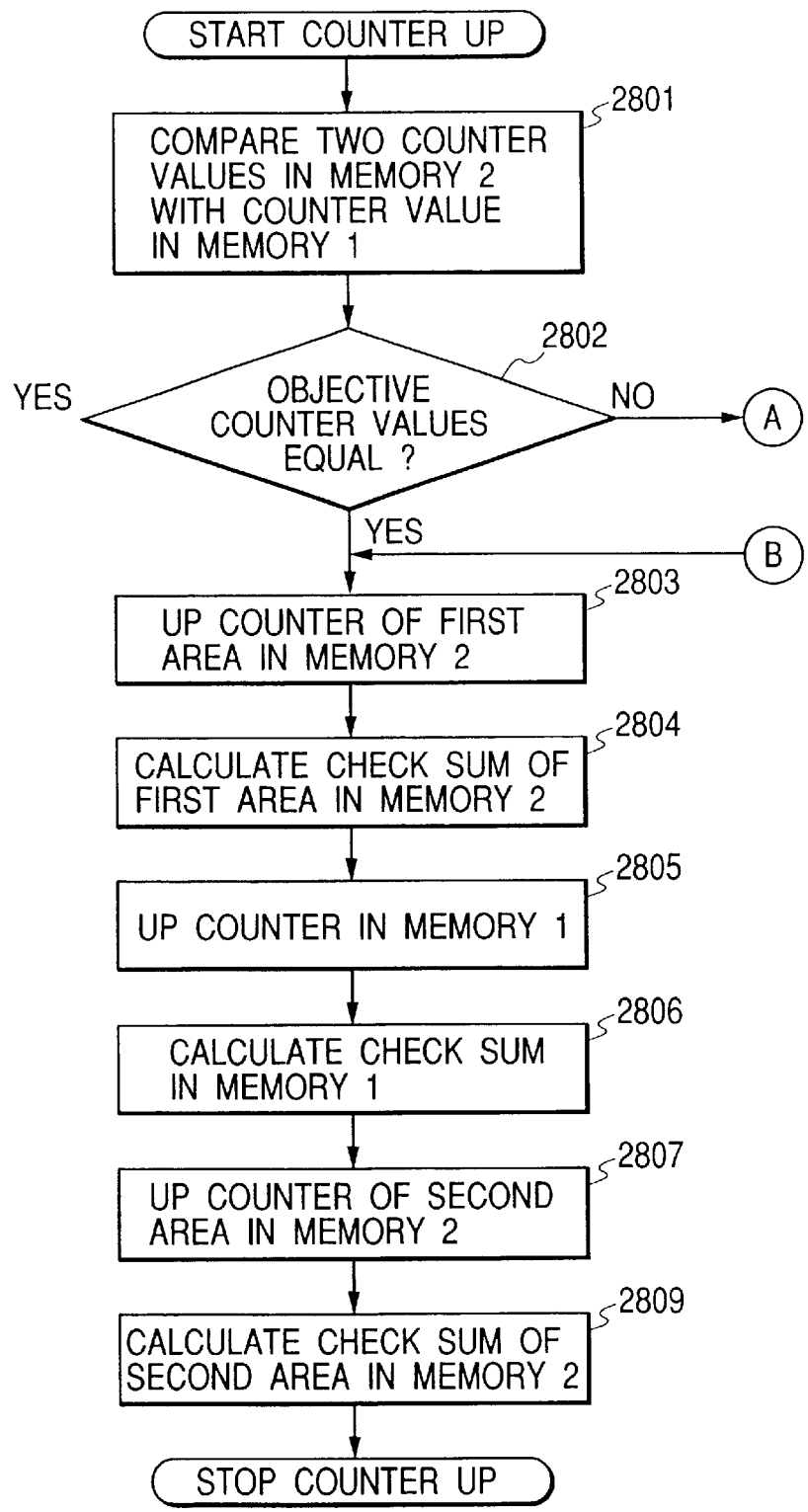

COUNTING APPARATUS, COUNTING METHOD, AND COMPUTER READABLE STORAGE MEDIUM

BACKGROUND OF THE INVENTION

1 Field of the Invention

The present invention relates to a counting apparatus for counting the number of executions of a predetermined operation in electronic equipment or the like, a method, and a computer readable memory medium adapted for use in such an apparatus.

2 Related Background Art

For counting the total number of outputs of an image forming apparatus, a mechanical so-called hardware counter has generally been used. In such a hardware counter, it is difficult to decrease or forge the count once the counting is made, so that such a hardware counter is suitable for a system in which the service is charged according to the count.

However, with the development of image forming apparatuses with various service modes such as image reduction/enlargement, color/monochromatic printing, and copying/printing/faxing etc., there is an increasing demand for dividing the service charging system according to such services, and a corresponding increase in the number of hardware counters will result in a drawback of increased cost and space.

There may be employed a software counter for storing the counts in a semiconductor memory, thereby providing the required number of counters with a low cost and without causing an increase in the space.

However, such software counters tend to lose the information contained therein because of the structural nature thereof, thus being unreliable for use in a service charging system.

SUMMARY OF THE INVENTION

In consideration of the foregoing, an object of the present invention is to improve the reliability of the software counter.

The above-mentioned object can be attained, according to an embodiment of the present invention, by a counting apparatus comprising execution detection means for detecting the execution of a predetermined operation, plural memory means for commonly storing the information relating to the number of execution of the operation upon each execution thereof, destruction detection means for detecting, at the storage of the above-mentioned information, whether the information stored in each memory means has been destructed, and correction means adapted, in case of detection of destruction of the information in one of the memory means, to correct the destructed information with the information of another memory means.

According to the present invention, there is also provided a memory medium storing a program for executing an execution detecting step of detecting the execution of a predetermined operation, a destruction detecting step of detecting, after the above-mentioned detection of execution, whether the information in plural memory means for commonly storing the information relating to the number of execution of the operation has been destructed, and a correction step adapted, in case of detection of destruction of the information in one of the memory means, to correct the destructed information with the information of another memory means.

Other objects of the present invention, and the features thereof, will become fully apparent from the following description which is to be taken in conjunction with the attached drawings.

BRIEF DESCRIPTION OF THE DRAWINGS

FIG. 3 is a list of video I/F signals;

FIG. 9 is a block diagram showing the configuration with an inserted reader controller;

DETAILED DESCRIPTION OF THE PREFERRED EMBODIMENTS

Preferred embodiments of the present invention will be described with reference to the attached drawings.

Figure 1:
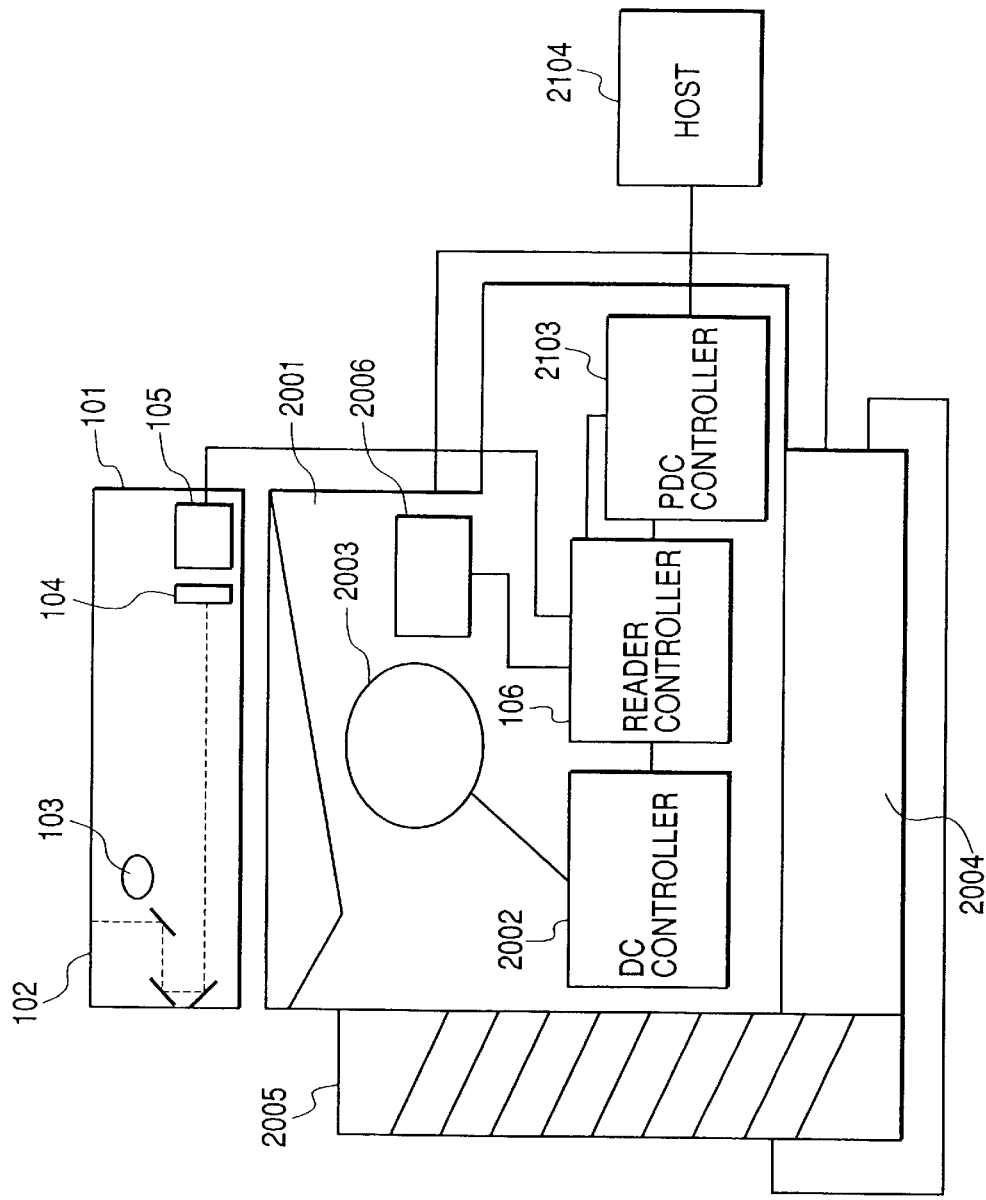
FIG. 1 is a schematic view showing the entire configuration of a controller and a printer in an image forming apparatus embodying the present invention.

In FIG. 1 there are shown a reader frame 101, an original table 102, a light source 103, photoelectric conversion means 104, image processing means 105 including analog-digital conversion means etc., and a reader controller 106.

FIG. 1 is a block diagram showing the configuration of an image forming apparotus embodying the present invention.

There are also shown a printer main body 2001, a DC controller 2002 for controlling the sheet transportation and the image formation in the printer, an image forming unit 2003, a printer controller 2103 shown in FIGS. 16, 17 to be explained later and incorporated in the printer main body 2001, a host computer 2104 connected in either a 1-to-1 relation or through a network 2105 shown in FIG. 17 to the printer controller 2103, an optionally added sheet feeding cassette deck 2004, an optionally added sorter 2005, and an optional controller 2006 for controlling the optional cassette deck 2004 and the optional sorter 2005.

The above-mentioned reader controller 106 has functions of controlling communication with the image processing means 105, unrepresented motor control means for reading an original, the DC controller 2002 and the printer controller 2103.

Configuration of Printer Controller and Printer

In the present embodiment, the reader controller 106 is connected between the printer controller 2103 and the printer, for controlling the process therebetween. At first there will be explained the configuration of such printer controller 2103 and printer, to be employed in such system.

Figure 17:
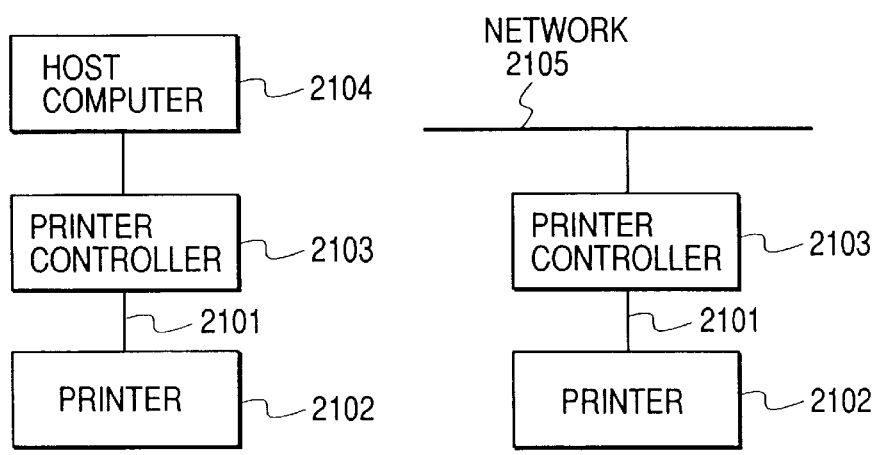
FIG. 17 is a view showing the system configuration of the printer.

At first reference is made to FIG. 17 for explaining the entire configuration. A video I/F 2101 executes communication between the printer 2102 and the printer controller 2103 with I/F signal to be explained later in detail. The printer 2102 forms an electrical image signal, received through the video I/F 2101, into a visible image, transfers such image on a recording sheet and outputs the recording sheet after image fixation. It controls various loads in order to execute such image forming sequence. It also has a function of detecting the status of the printer 2102 and informing the printer controller 2103 of such status.

The printer controller 2103 receives data transmitted from a host computer 2104 or through a network 2105. The data are transmitted in various formats such as bit map data or PDL (page description language) described data. The data are developed into a raster format in a memory, and transferred to the printer 2102.

In this manner the data prepared in the host computer 2104 can be outputted in the printer.

Figure 2:
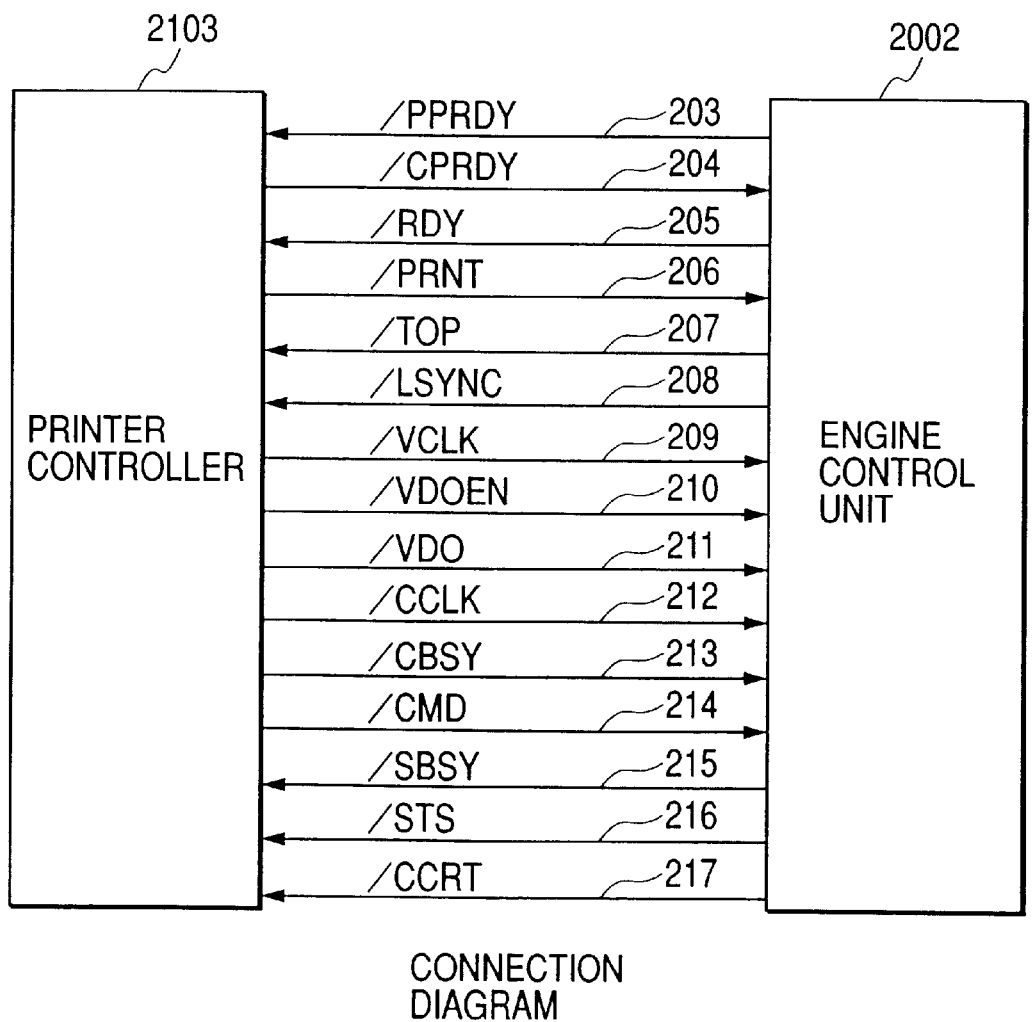
FIG. 2 is a block diagram showing the connection between a printer controller and an engine control unit.

In the following there will be explained in detail the video I/F 2101 connecting the printer controller and the printer. Referring to FIG. 2, there are shown the printer controller 2103, and an engine control unit (DC controller) 2002 for controlling an engine provided in the printer 2102 shown in FIG. 17. Signals shown in FIG. 17 are exchanged between the printer controller 2103 and the engine control unit 2002.

FIG. 3 is a list of the signals of the video I/F. In the following there will be explained only the representative signals shown in FIG. 2.

A/PPRDY signal 203 indicates that the communication with the printer controller is enabled after the start of power supply to the printer and after the initialization process.

A/CPRDY signal 204 indicates that the communication with the engine control unit is enabled after the start of power supply to the printer controller and after the initialization process.

A/RDY signal 205 indicates that the engine control unit is enabled for the printing operation by a print start instruction (/PRNT signal to be explained later) from the printer controller. This signal becomes true only in case of normal functions of various units in the printer function normally, such as that the fixing unit has reached a predetermined temperature, that the recording sheet does not remain in the printer and that the polygon mirror rotates at a predetermined speed.

A/PRNT signal 206 indicates the start of continuation of the printing operation from the printer controller to the entire control unit.

A/TOP signal 207 is a synchronization signal transferred from the engine control unit to the printer controller, as reference for the vertical scanning. This signal is outputted at a predetermined time after the output of the signal 206 from the printer controller.

A/LSYNC signal 208 is a synchronization signal to be used by the printer controller as reference of the horizontal scanning, and is outputted, like to the/TOP signal, to the printer controller at a predetermined time after the output of the signal 206 from the printer controller.

A/VCLK signal 209 is a synchronization clock signal for/VDOEN and/VDO signals to be explained later, and is generated by the printer controller with a frequency corresponding to that of the image signal.

A/VDOEN signal 210 controls fetching of the image signal from the printer controller, into the engine control unit. The engine control unit detects whether this signal is TRUE or FALSE in synchronization with the/VCLK signal, and the image signal is fetched or not respectively if it is TRUE or FALSE.

A/VDO signal 211 is the image data. The printer controller outputs this signal in synchronization with the/VCLK signal, taking the/TOP signal and the/LSYNC signal as reference respectively in the vertical and horizontal directions.

A/CCLK signal 212 is a synchronization clock signal, outputted from the printer controller, when the printer controller transmits a serial command to the engine control unit or when the engine control unit returns a serial status to the printer controller.

A/CBSY signal 213 indicates, to the engine control unit, that the printer controller is in the course of transmission of a serial command, using a /CMD signal to be explained later.

A/CMD signal 214 is used when the printer controller returns serial information to the engine control unit, and such serial information will hereinafter be called a command.

A/SBSY signal 215 indicates, to the printer controller, that the engine control unit is in the course of returning a serial status, using a/STS signal.

A/STS signal 216 is used when the engine control unit returns serial information to the printer controller, and such serial information will hereinafter be called a status.

A/CCRT signal 217 is used for informing the printer controller of a change in the status of the printer. In response to this signal, the printer controller issues a command, utilizing the/CMD signal, inquiring the changed parameter of the engine, and the engine control unit in response informs the changed parameter by the/STS signal.

Figure 4:
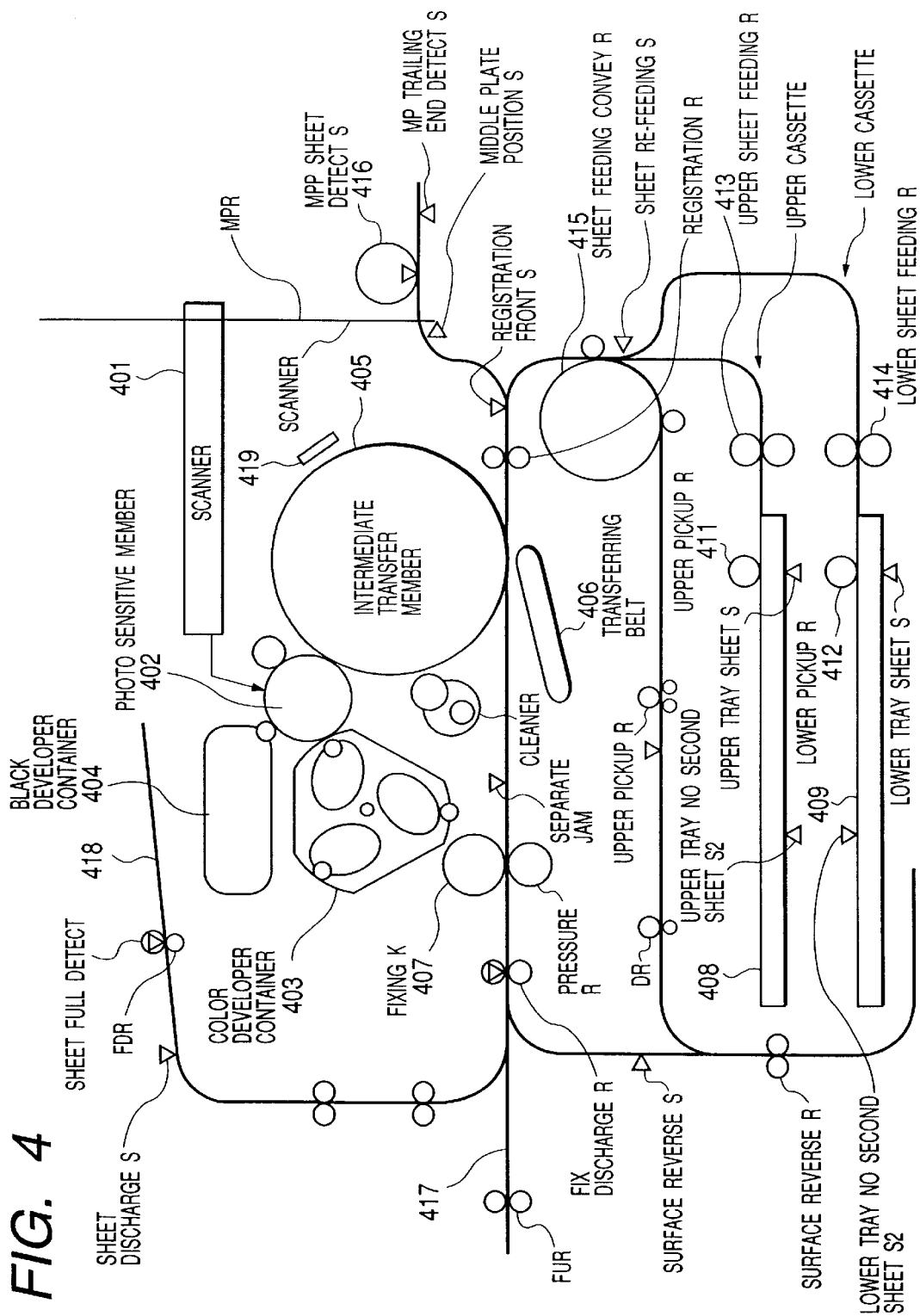
FIG. 4 is a view showing the configuration of a sheet conveying mechanism.

In the following there will be explained, with reference to FIG. 4, a printer controlled by the engine control unit. FIG. 4 is an elevation view of the printer, seen from the front.

A scanner 401 receives the image signal/VDO transmitted from the printer controller, and converts it into a laser beam for scanning a photosensitive member 402. The photosensitive member 402 is rotated counterclockwise and, after being exposed to the laser beam, reaches a color developing unit 403 and a block developing unit 404. Each of the developing units 403, 404 serves to deposit toner onto the photosensitive member (image development) according to the charge accumulated on the photosensitive member. When the image is monochromatic the developing unit 404 alone is activated, but, when the image is colored, both developing units 403, 404 are activated. The image generated on the photosensitive member 402 is then transferred onto an intermediate transfer member 405 rotated clockwise. The image formation on the intermediate transfer member is completed by a turn in case of a monochromatic image or by four turns in case of a color image.

On the other hand, a recording sheet fed from an upper cassette 408 or a lower cassette 409 by a pickup roller 411 or 412 is conveyed by feeding rollers 413 or 414 and by conveying rollers 415 to a position in front of registration rollers.

The recording sheet is so controlled as to reach a position between the intermediate transfer member 405 and a transfer belt 406 at a timing when the aforementioned image formation is completed on the intermediate transfer member. Upon arrival of the recording sheet, the transfer belt is brought into contact with the intermediate transfer member, whereby the toner is transferred onto the recording sheet. The image transferred onto the recording sheet is fixed by heat and pressure applied by a fixing roller 407.

The recording sheet being the fixed image is conveyed to and discharged at a face-up discharging exit 417 or a face-down discharging exit 418, designated in advance by the printer controller. In this manner the output of the image information transmitted from the printer controller can be achieved.

Figure 5:
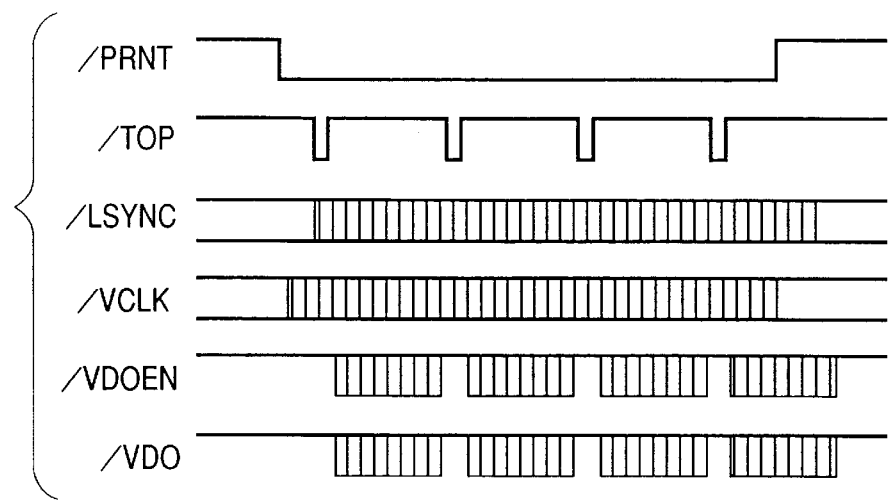
FIG. 5 is a timing chart of image signals.

In the following there will be explained, with reference to FIG. 5, the timing of signal exchanges by the video I/F 2101. FIG. 5 shows the aforementioned signals of the video I/F, along the lapse of time.

At first, when the preparation of the image information in the printer controller is completed, such state is transmitted to the engine control unit by shifting the/PRNT signal to a low-level (true) state. At the same time, there is generated the image sync signal/VCLK to be used for image signal transfer. In response the engine control unit executes various settings in the printer, and, when it becomes ready for receiving the image, it transmits the/TOP and/LSYNC signals to the printer controller. In synchronization with the vertical sync signal/TOP and the horizontal synchronization signal/LSYNC, the printer controller transfers the image signal/VDO and the image effective signal/VDOEN to the engine control unit.

Figure 6:
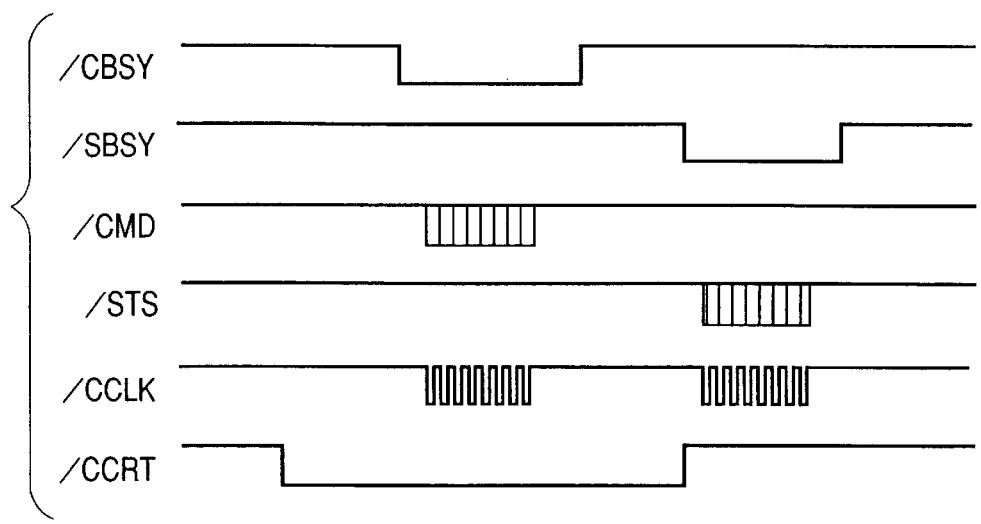
FIG. 6 is a timing chart of serial communication.

In the following there will be explained the exchange of commands and statuses by serial communication during the printing operation. FIG. 6 shows the timing of communication between the printer controller and the engine control unit.

At first there will be explained a case where the lowermost/CCRT signal is not used. In case the printer controller issues a command to the engine control unit, the/CBSY signal is shifted to the low-level (true) state and command data are transmitted to the/CMD signal in synchronization with the clock signal/CCLK. Upon receiving such signal, the engine control unit, after confirming that the/CBSY signal is in the high-level (false) state, shifts the/SBSY signal to the low-level (true) state and sends the status data of the engine, corresponding to the command, to the/STS signal in synchronization with the /CCLK signal. The printer controller receives the status data and continues or interrupts the printing control according to such status data.

In the following there will be explained the/CCRT signal, which is shifted to the low-level (true) state in case a change occurs in the engine state designated by the printer controller in advance. As an example, it is assumed that the printer controller sets in advance, by the/CMD signal in such manner that the /CCRT signal becomes effective in case the recording sheet becomes absent, and that the printer controller issues a printing request for two prints in a state where only one recording sheet remains. The first print is processed in the normal printing sequence. However, as the second recording sheet is absent, the printer engine detects the change of state at the start of the second image formation and shifts the/CCRT signal from the high-level state to the low-level state.

This signal is transmitted to the printer controller, which, in response, issues a command requesting the sheet presence/absence status to the engine control unit, in order to know the sheet cassette in which the recording sheet is absent. In response, the engine control unit returns the status of the cassette without the recording sheet to the printer controller. The/CCRT signal is cleared to the high-level state when the/SBSY signal, indicating the status returning, is shifted to the low-level state.

Figure 7:
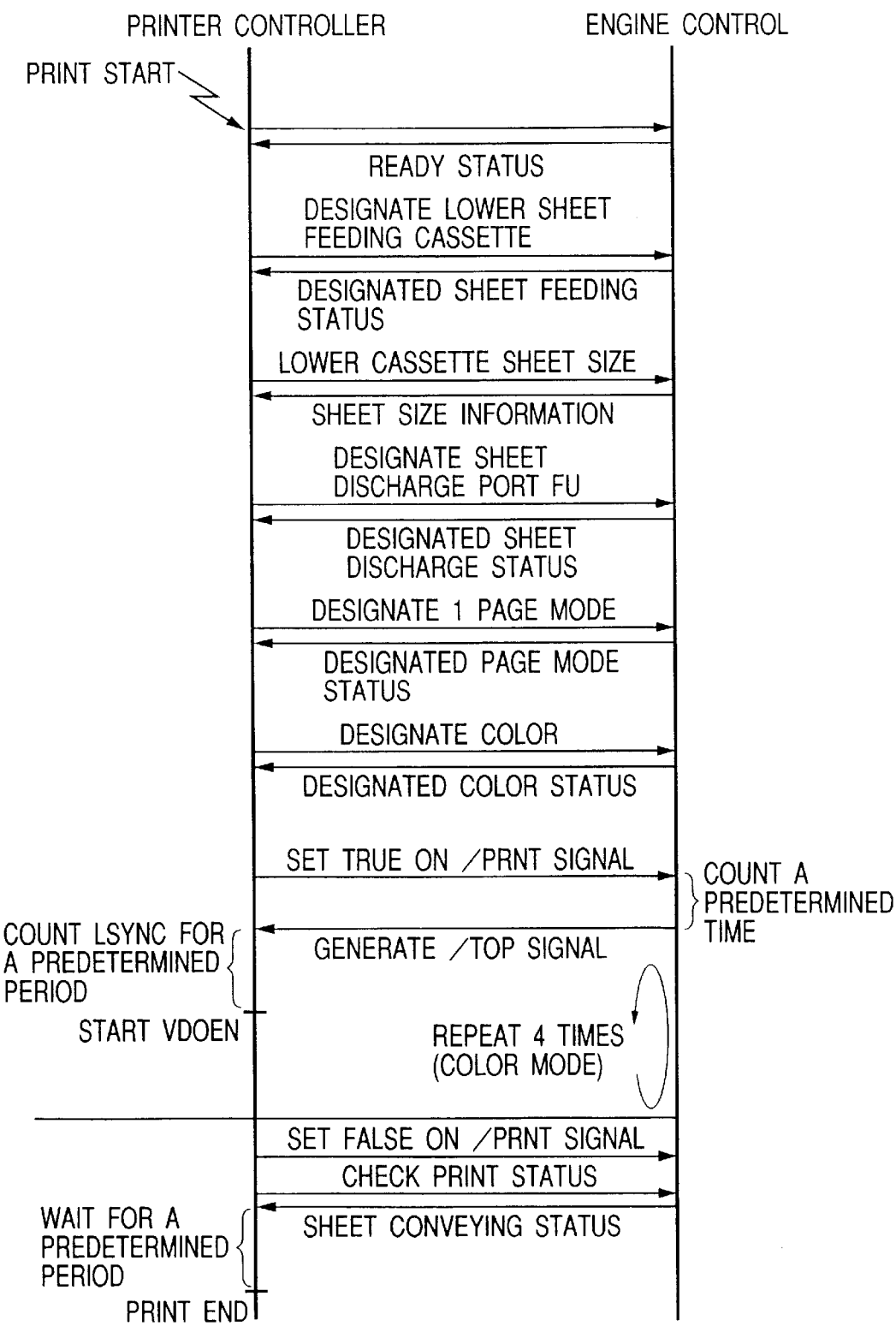
FIG. 7 is a sequence chart showing communications in a printing operation.

In the following the printing operation will be explained in more detail, with reference to FIG. 7 showing the command/status exchange between the printer controller and the engine control unit. The following description assumes a case of a color image output. When a print start request is generated, the printer controller checks the ready state of the printer, through the engine control unit, while executing conversion of the image data. Then the printer controller issues a command for designating the sheet feeding cassette, and a command request the size of the recording sheet contained in the designated cassette. In response to these commands, the engine control unit returns corresponding statuses.

The printer controller then determines the sheet discharging exit by a command designating the sheet discharging exit, and issues a page mode designation command for designating the number of pages of image formation. Finally it issues a command for designating the monochromatic/color mode, whereby all the settings in the printer are completed.

Thereafter the printer controller sends the print request signal/PRNT to the engine control unit, which in response returns the/TOP signal after a predetermined time. Then the image transfer is made to the engine control unit by the/VDO signal in synchronization with the/VCLK signal, also in synchronization with the/TOP signal in the vertical scanning direction and with the/LSYNC signal in the horizontal scanning direction. Since the color mode is assumed, the/TOP signal is generated four times to form images of four colors of C, M, Y and K.

After the generation of the last/TOP signal, the /PRNT signal is returned to the high-level (false) state, whereby the engine control unit detects the end of the print request and enters a post-procedure such the cleaning of the intermediate transfer member. Also the recording sheet bearing the transferred image passes the fixing roller and is discharged to the designated discharging exit. The printing operation is terminated after the printer controller confirms with the engine control unit that the recording sheet is not in conveying operation (sheet discharge completed), and the printer controller waits in the ready state until a next print request is generated.

In case an illegal state such as jamming of a recording sheet, absence of recording sheet described in the foregoing or door opening by the user is generated in the course of the above-described operations, such abnormal state of the printer is immediately transmitted by the/CCRT signal from the engine control unit to the printer controller, and the printer controller executes a responsive process.

The processes are executed between the printer controller and the engine control unit in the above-described manner.

Figure 16:
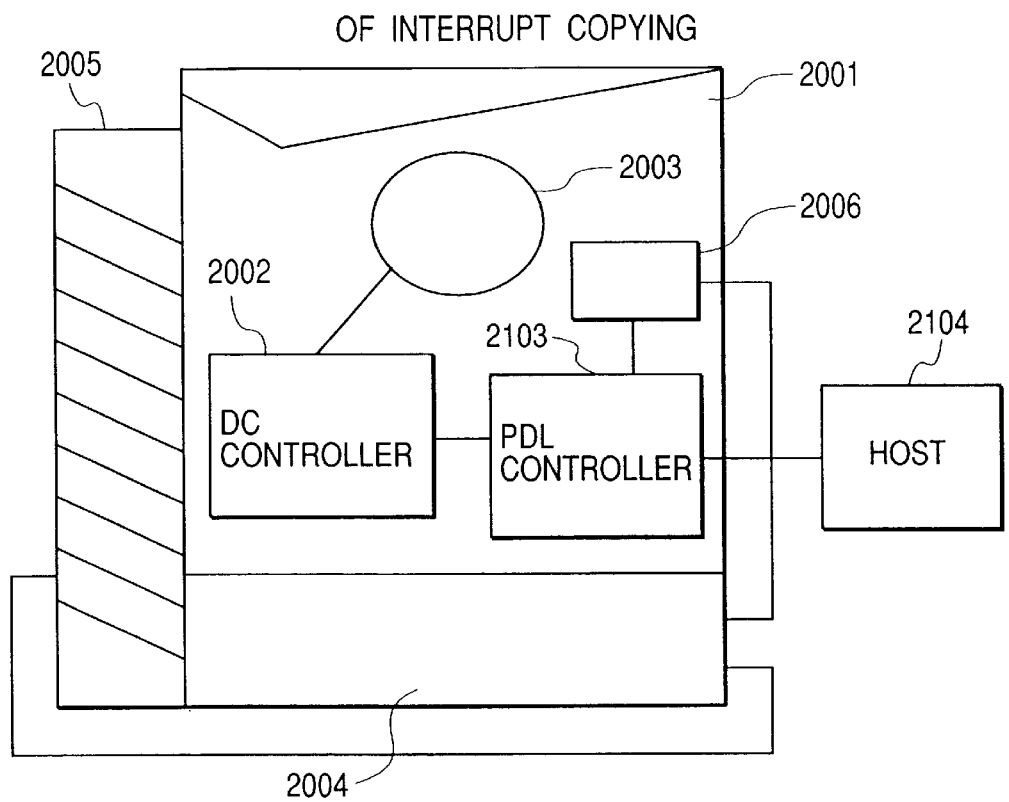
FIG. 16 is an external view of a printer.

FIG. 16 is a schematic view of the printing apparatus of the above-described electrical configuration. Referring to FIG. 16, there are provided a printer main body 2001, a DC controller 2002 for controlling the sheet transportation and the image formation in the printer, an image forming unit 2003, a printer controller 2103 corresponding to that shown in FIG. 17 and incorporated in the printer main body 2001 as illustrated, a host computer 2104 corresponding to that shown in FIG. 17 and connected in either a 1-to-1 relation or through a network 2105 to the printer controller 2103, an optionally added sheet cassette deck 2004, an optionally added sorter 2005, and an optional controller 2006 for controlling the optional cassette deck and the optional sorter.

Configuration with Reader Controller

Figure 8:
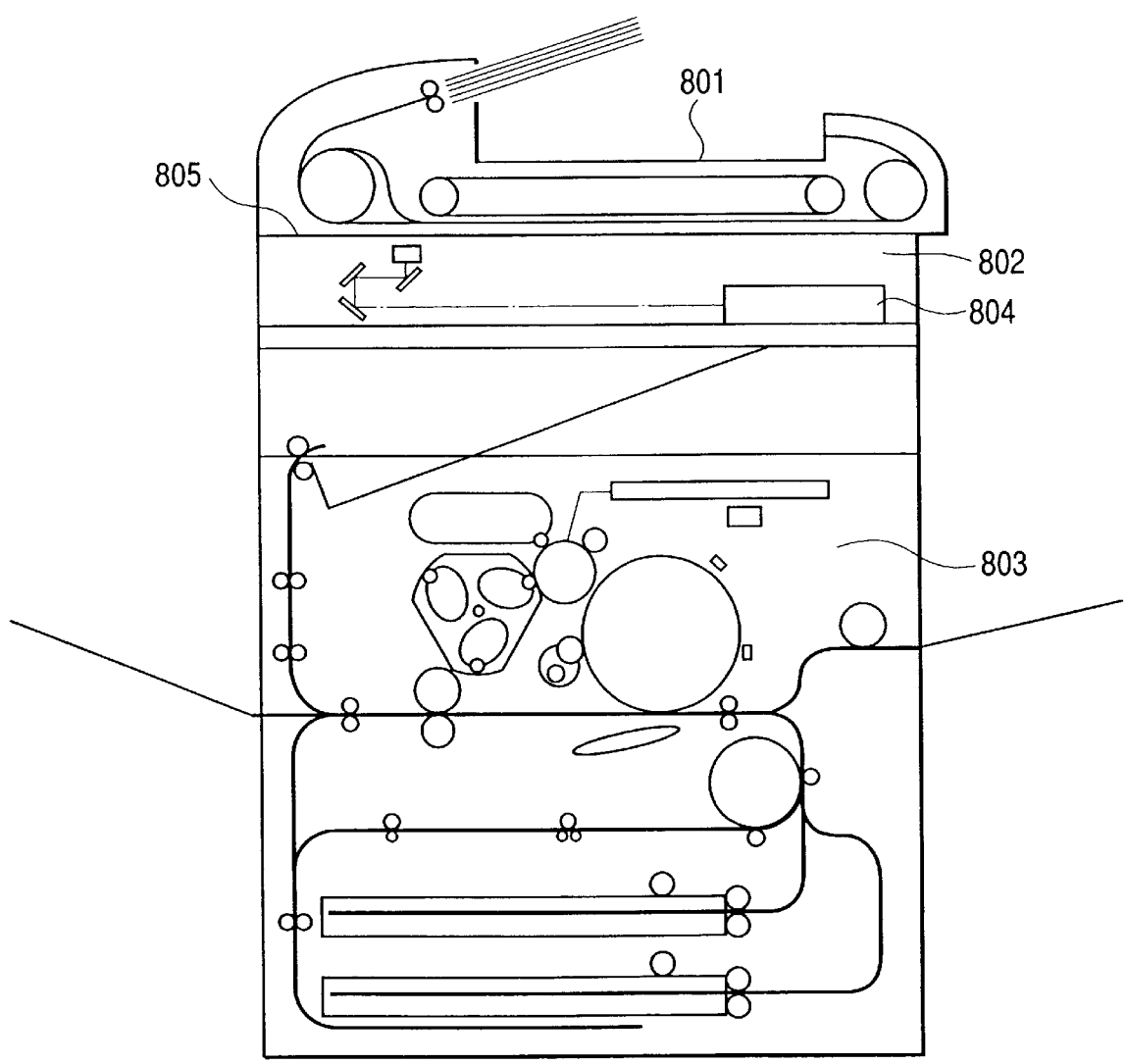
FIG. 8 is an external view showing a mounted state of a reader unit.

FIG. 8 is an external view in case the above-described printing apparatus is equipped with a reader controller for optically reading an original image on a sheet and converting it into a digital output signal, in addition to the image data outputted from the printer controller based on the data transferred from the computer.

There are provided an original feeding device 801 for conveying the original to an optical reading position; an optical reading device 802; and an original supporting glass 805. The original feeding device 801 is driven in synchronization with the optical reading device, and, when the original image is conveyed onto the original supporting glass 805 by the original feeding device 801, the optical reading device 802 scans the image by executing a motion in the lateral direction and transmits the light with suitable optical process to a photoelectric conversion unit 804. There is also shown a printer main body 803.

FIG. 9 is a view showing the electrical connection configuration in case the reader controller for reading the original image is added to the configuration of the printer controller and the engine control unit shown in FIG. 2. In FIG. 9, a reader controller 901 is connected, in the electrical connection, between the printer controller 2103 and the engine control unit 2002 shown in FIG. 2. The signal lines between the printer controller 2103 and the reader controller 901 and between the engine control unit 2002 and the reader controller 901 have same functions as those of the signal lines shown in FIG. 2. However, the signals between the printer controller 2103 and the reader controller 901 and those between the engine control unit 2002 and the reader controller 901 are physically different and are mutually distinguished by a suffix C for the former and a suffix P for the latter.

There are provided an image signal process unit 902; an original scanning optical system control unit 903 for controlling the optical reading device 802; an original feeding control unit 904 for controlling the original feeding device 801; an operation unit 905; and an image input unit 906 which enters the image signal obtained in the photoelectric conversion unit 804 and transfers the image signal to the image signal process unit 902 provided in the reader controller 901.

Figure 18:
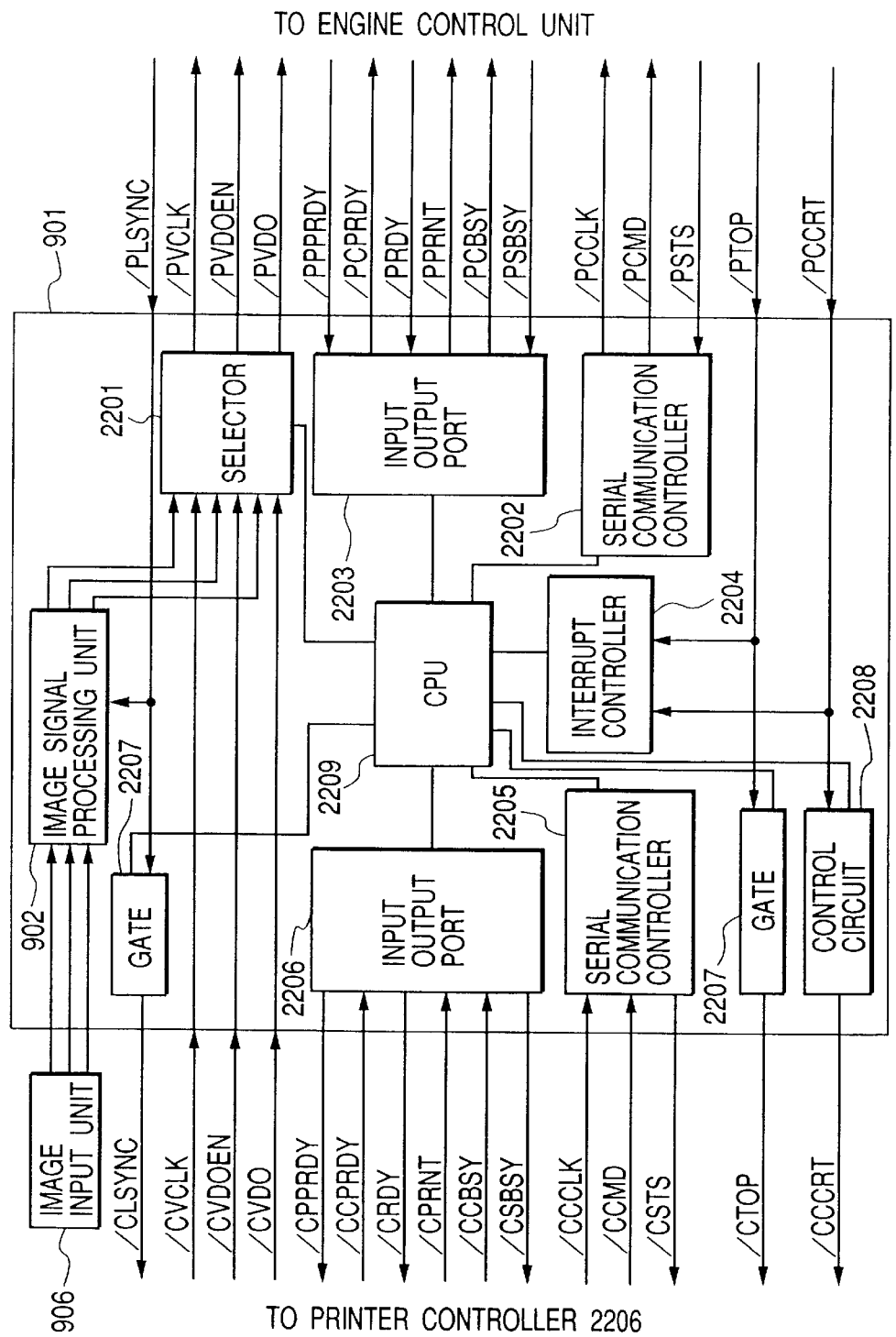
FIGS. 18 and 19 are detailed block diagrams of a reader controller.

FIG. 18 is a block diagram inside the reader controller 901.

In FIG. 18, there are shown a reader controller 901 shown in FIG. 9, the image process unit 902 shown in FIG. 9, the image input unit shown in FIG. 9, and a selector 2201 for selecting either of the output of the image process unit 902 or the signal supplied from the printer controller, for supply to the engine control unit. The selector 2201 switches three signal systems, —namely the image clock signal/VCLK, the image enable signal /VDOEN and the image data/VDO.

There are also provided a serial communication controller 2202 for effecting communication with the engine control unit, an I/0 port 2203, for exchanging signals complementing the communication in the communication controller 2202, an interruption controller 2204 receiving an image top request signal/PTOP and a printer status change signal/ PCCRT, a serial communication controller 2205 for effecting communication with the printer controller, and an I/0 port for exchanging signals complementing the communication in the communication controller 2202.

A gate 2207 controls whether or not to transmit the signal from the printer to the printer controller. This gate controls the image top request signal/PTOP and the line sync signal/ LSYNC. A control circuit 2208 having a gating function and a flag setting function controls the printer status change signal /CCRT. The gate 2207 controls whether or not to transmit the printer status change signal/PCCRT, issued by the engine control unit, to the printer controller, and also enables, by setting a flag, the reader controller to issue the printer status change signal/CCRT to the printer controller. A CPU 2209 controls the entire system.

Operation in Copying

In the following there will be explained the method of reading a full-color original image and outputting the image from the image forming apparatus, utilizing the above-described configuration. When an unrepresented copy start key on the operation unit 905 shown in FIG. 9 is actuated, the reader controller closes the above-described gate 2207 and signal control circuit 2208 for the copying mode, and so sets the selector 2201 as to select the output of the image process unit 902. It then checks, with the engine control unit, the state of the ready state signal/PRDY of the printer, and executes various settings through the serial communication controller 2202.

At first it issues a command for designating the feeding deck for the recording sheet, and issues a command requesting the size of the recording sheet in the designated cassette. In response to these requests, the engine control unit returns statuses corresponding thereto.

It then determines the sheet discharging exit by a corresponding designating command, and a page mode designating command for designating the number of pages of image formation. Finally it issues a command for designating the monochromatic/color mode, whereupon all the settings in the printer are completed.

After the original is fed onto the original supporting table by the original feeding device 801, the reader controller sends a print request signal /PPRNT to the engine control unit, which in response returns the/PTOP signal after a predetermined time. This signal is processed in the interruption controller to activate the optical reading device 802 in synchronization with the/PTOP signal. Then the signal entered from the photoelectric conversion device 804 to the image process unit 902 is transferred, as the signal/PVDO signal in synchronization with the/PVCLK signal, also in synchronization with the/PTOP signal in the vertical scanning direction and with the/LSYNC signal in the horizontal scanning direction. As the color mode is selected in the present example, the optical reading device 2002 is activated four times to form the images of four colors of C, M, Y and K, based on the/PTOP signal generated four times.

After the generation of the last/PTOP signal, the /PPRNT signal is returned to the high-level (false) state, whereupon the engine control unit detects the termination of the print request and enters a post-process such as the cleaning of the intermediate transfer member. The recording sheet bearing the transferred image thereon passes the fixing roller, and is discharged to the designated discharging exit. After the reader controller finally confirms with the engine control unit that the recording sheet is not in transportation (completion of sheet discharge), the printing operation is terminated and the reader controller waits in the ready state until a next print request is generated.

Operation in Printing

In the following there will be explained the method of outputting the image from the printer controller, utilizing the image forming apparatus. At the end of a copying operation, the reader controllers enters the ready state and releases the aforementioned gate 2207 and signal control circuit 2208 for the printing operation. The reader printer confirms, with the engine control unit, the ready state signal/PRDY of the printer, through the I/O port 2203, and, if the signal is OK, it sets the ready state signal/CRDY of the printer in the printer controller, utilizing the I/O port 2206.

Then the printer controller executes communication for effecting various settings. The communication is received by the reader controller through the serial communication controller 2202 and is interpreted by the CPU 2209. According to the content of the communication, the reader controller executes various settings, utilizing the serial communication controller 2202. In response to a series of commands, the engine control unit returns corresponding statuses to the reader controller, which receives such statuses by the serial communication controller 2202. The received content is interpreted by the CPU 2209, and the communication is then to the printer controller through the serial communication controller 2202.

Then the printer controller sends a print request signal/CPRNT to the reader controller, which in response sends a print request signal/PPRNT to the engine control unit. In response the engine control unit returns the/PTOP signal after a predetermined time. This signal is passed by the gate control unit 2208 and is returned, as the/CTOP signal, to the printer controller.

The printer controller transfers the/CVDO signal to the reader controller, in synchronization with the /CVCLK signal and in synchronization with the/CTOP signal in the vertical scanning direction and with the /CLSYNC signal, obtained by passing the/PLSYNC signal through the gate control unit 2207, in the horizontal scanning direction. In the reader controller, the selector 2201 is so set as to select the signals transferred from the reader controller, so that the signals/PVCLK,/PVDOEN and/PVDO transferred from the reader controller are transferred to the engine control unit.

Difference in Printing Operation and Copying Operation

In the following there will be explained the difference, in the timing of image transfer, between the operation in the printing mode and that in the copying mode.

Though the detailed configuration of the printer controller 2103 is not explained, it is provided therein with an image memory, in which the image data for printing are prepared therein in advance. Consequently, the time required for outputting the print data/VDO in response to the image top request signal/TOP transferred from the engine control unit is limited to an electrical delay time.

Figure 20:
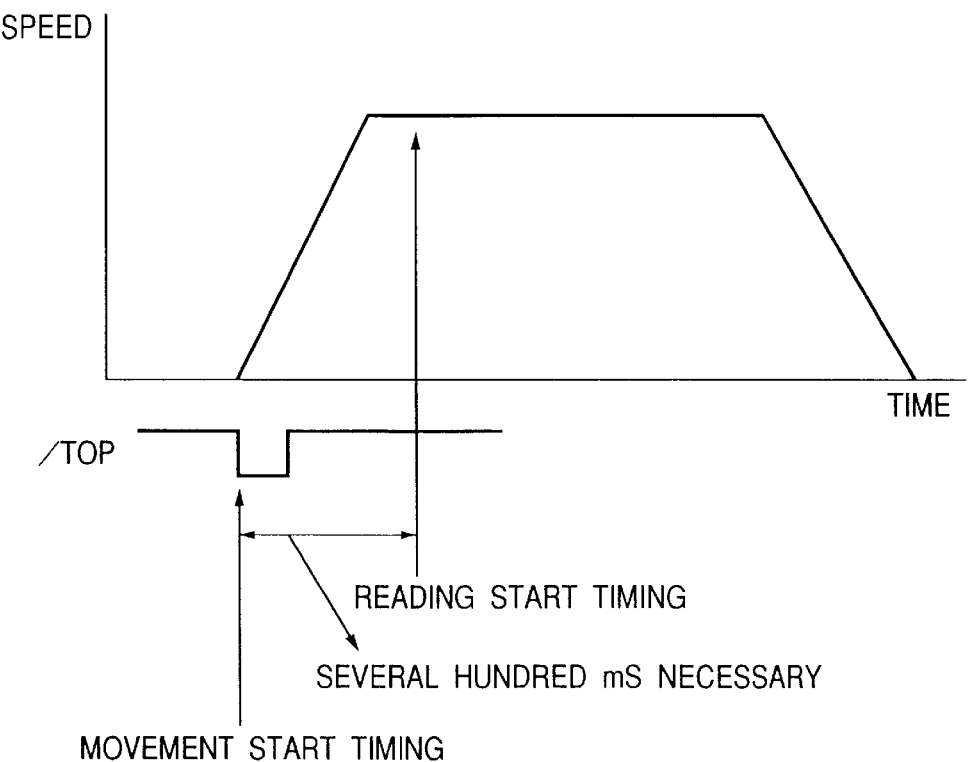
FIG. 20 is a chart showing the difference in timing between copying and printing.

On the other hand, in the copying mode, the image data are outputted while the image reading device 802 moves and reads the original. For shifting from a stopped state of the image reading device to a high-speed moving state for reading the original, there is required an acceleration time of for example several hundred milliseconds as shown in FIG. 20. Therefore, if the engine control unit outputs the image top request signal/TOP in the copying mode at a timing same as that in the printing mode, the engine receives the print data/VDO later by about 100 milliseconds in the copying mode.

In order to overcome such situations there are conceived the following two methods:

1. outputting the/TOP signal earlier in the copying mode than in the printing mode; and
2. using a separate signal (RSTART) for the copying mode.

Figure 19:
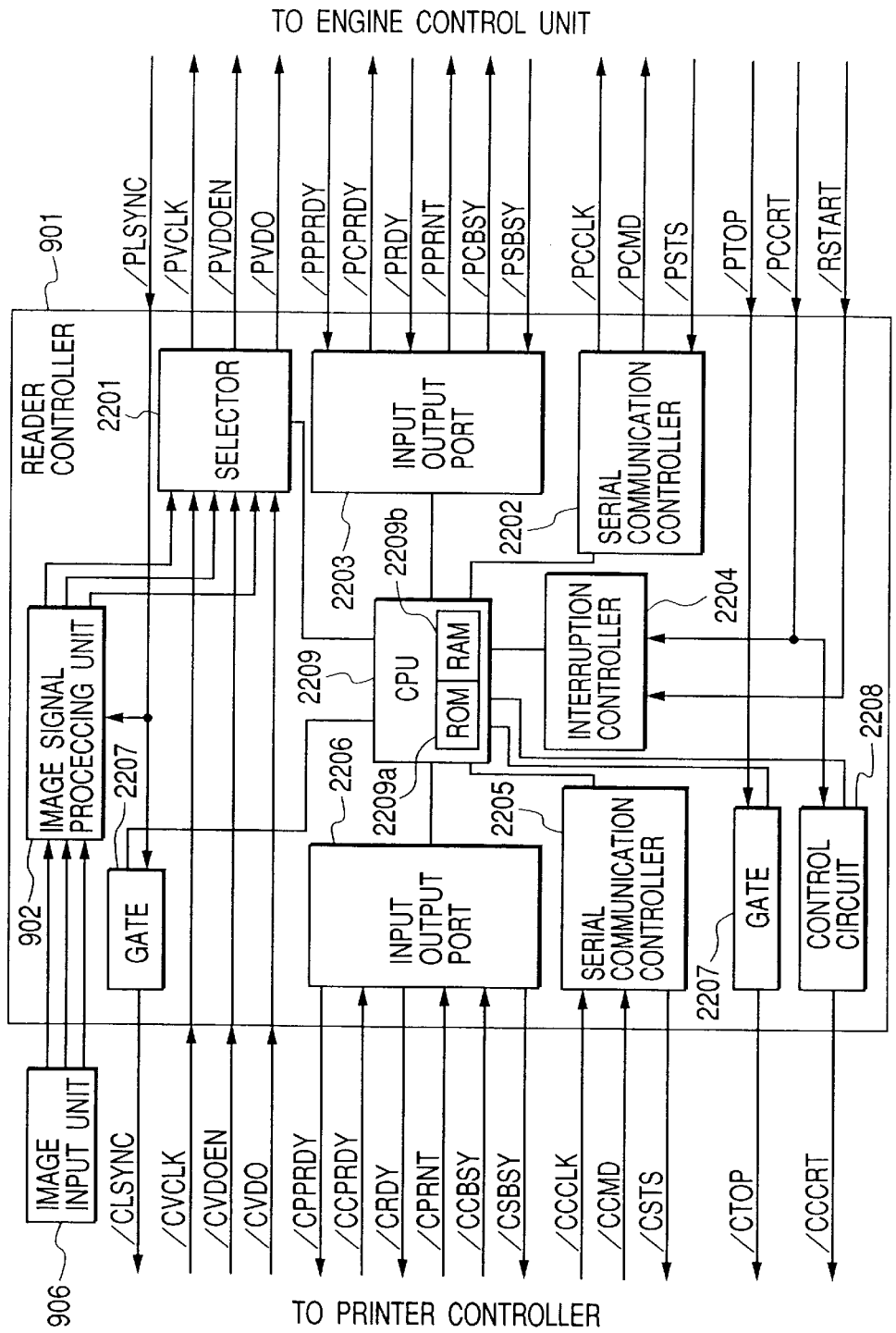

The method 1 can be realized without changing the configuration of the reader controller shown in FIG. 18, and, in the copying mode, the reader controller starts the movement of the original reading device by the/TOP signal. Also the method 2 can be realized by assumed a configuration shown in FIG. 19. More specifically, the image top request signal/PTOP outputted from the engine control unit is only required for the printer controller for executing the printing operation but need not be entered into the interruption controller of the reader controller. Also the movement start request signal/RSTART for the reading device, outputted from the engine control unit, is request only in the copying mode and need not be transferred to the printer controller.

Control for the Setting Command

In the following there will be explained the control of the present embodiment.

The communication between the printer controller and the engine control unit is changed in the following manner by the connection of the reader controller therebetween.

In the following there will be explained a case that the printer controller issues a setting command, for example a sheet cassette changing command, to the printer, while the reader controller reads and outputs the original image, utilizing the engine control unit (copying mode).

Figure 10A:
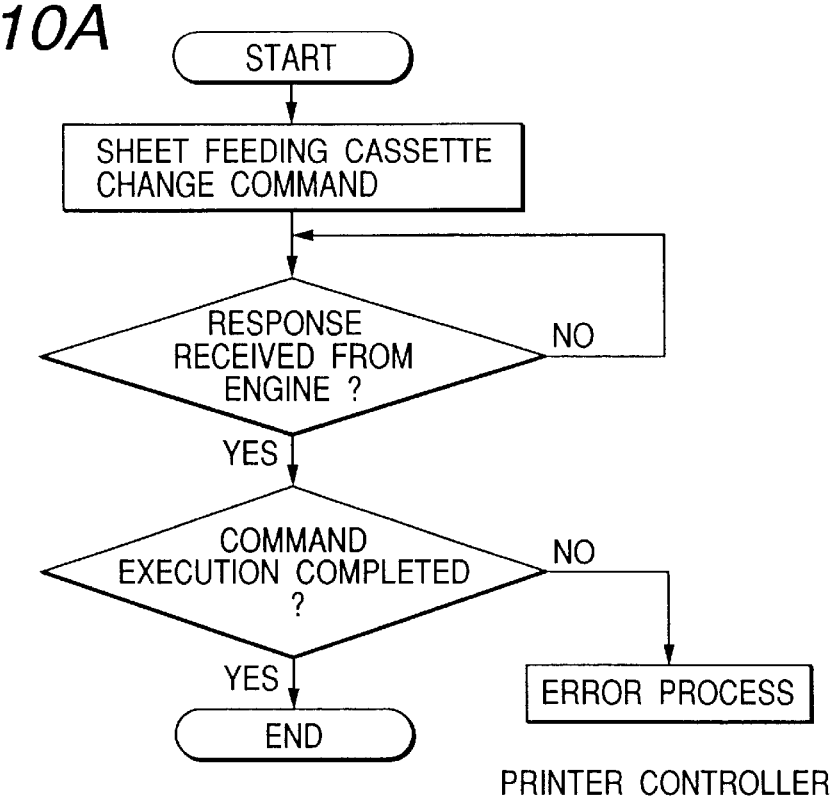
FIGS. 10A and 10B are flow charts showing the communication sequence in the absence of the reader.
Figure 10B:
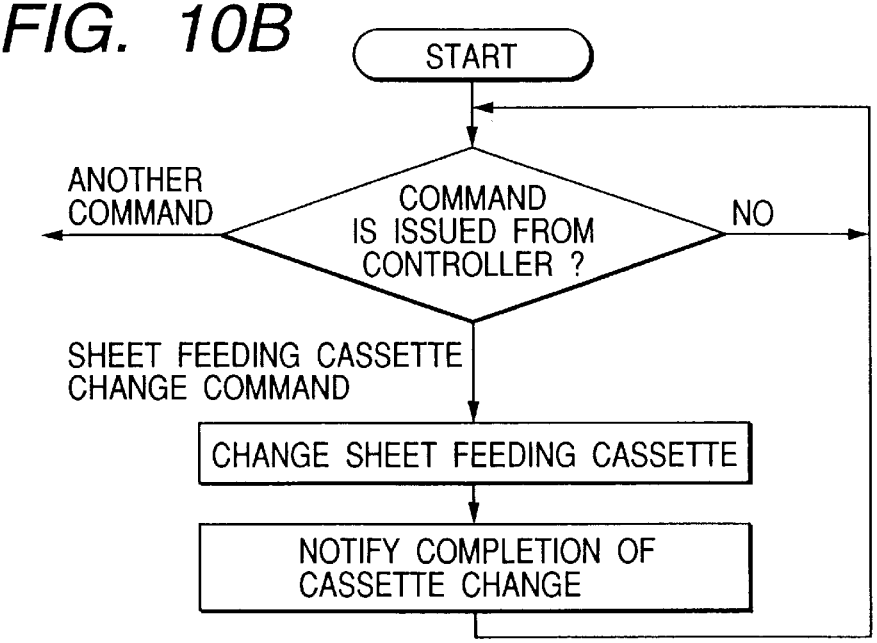

FIGS. 10A and 10B show the command issuing sequences in the configuration shown in FIG. 2, namely without the reader controller between the reader controller and the engine control unit. FIG. 10A indicates the process sequence in the printer controller, while FIG. 10B indicates the process sequence in the engine control unit. After issuing the sheet cassette changing command, the printer controller waits for the response from the engine control unit, and, upon receiving the response, it judges the successful command execution whereupon the serial command issuing sequence is terminated. The engine control unit, upon receiving the command from the controller, judges the content of the command, and, in case of the sheet cassette changing command, informs the printer controller of the successful command execution when the cassette is changed successfully.

Figure 11A:
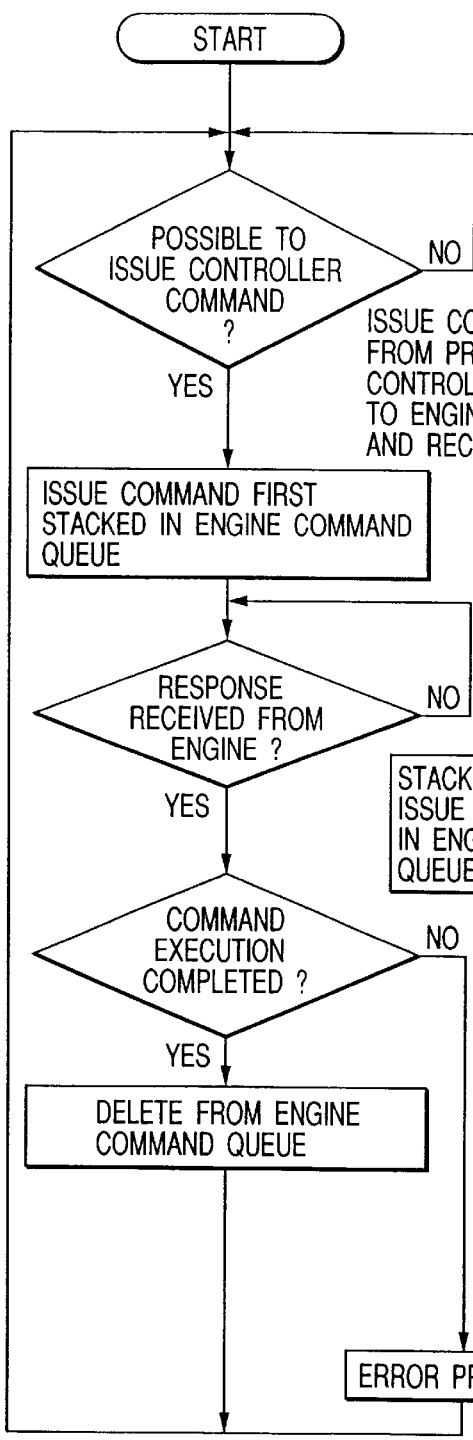
FIGS. 11A and 11B are flow charts showing the communication sequence in the presence of the reader.
Figure 11B:
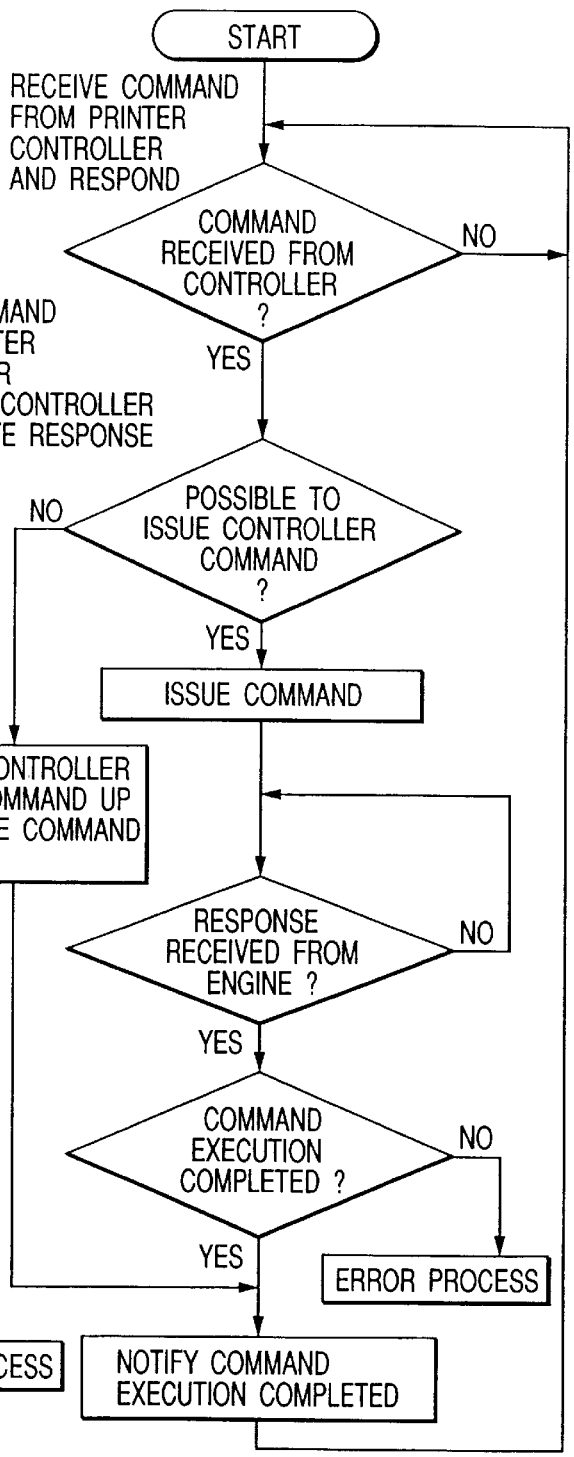

In contrast, FIGS. 11A and 11B show the control flows in the reader controller in the configuration shown in FIG. 9 in which the reader controller is inserted. The printer controller and the engine control unit execute control equivalent to that explained in the foregoing with reference to FIGS. 10A and 10B.

FIG. 11B indicates the control flow for receiving the command from the printer controller and returning the status thereto. The reader controller receives, by the serial communication controller 2205, a command from the printer controller through the/CCMD signal line shown in FIG. 9, and judges whether such command can be issued to the engine control unit under the current situation.

For example, if the reader controller has no command under execution in the engine control unit for the operation of the copying mode, a command same as the command received from the printer controller is issued by the serial communication controller 2202 to the engine control unit through the/PCMD signal line.

On the other hand, in a situation where the proper copying operation is hindered by the issuance of the command, transferred from the printer controller, to the engine control unit, for example in case the reader controller is in the course of a copying operation with the designation of a sheet cassette, the command is not issued to the engine control unit but is accumulated, in an engine command queue which stores the commands to issued from the printer controller to the engine control unit, in the order of issuance of such commands. As a response to the command has to be returned to the printer controller, a pseudo response indicating the successful command execution is returned from the reader controller, by the serial communication controller 2205, to the printer controller through the /CSTS signal line.

In the following there will be explained, with reference to a flow in FIG. 11A, a case where the reader controller is rendered capable, without affecting the status thereof, of issuing the command, received from the printer controller, to the engine control unit. In case such situation is reached, the reader controller issues, by the serial communication controller 2202, a command accumulated in the engine command queue to the engine control unit through the /PCMD signal line and awaits the response. The command to be issued by the reader controller itself is also transmitted to the engine control unit through the /PCMD signal line.

Upon completion of the command execution, the engine control unit returns a response, through the /PSTS signal line to the reader controller. In case of successful execution of the command, such command is deleted from the engine command queue. If a failure in the command execution in the engine is identified, there is executed a process for the error state.

As explained in the foregoing, even in the configuration with the inserted reader printer, the ordinary command issued from the printer controller to the engine control unit can operate the command process sequence without mismatching in the operations.

Control in State Change Signal

In the following there will be explained, in the configuration with the inserted reader controller, the process in a case where a state change, for example an error state, in the engine is transmitted by the/PCCRT signal from the engine control unit to the reader controller. In such configuration with the inserted reader controller, the state change to be known may be different between the reader controller and the printer controller. Such situation may arise for example in case of jamming of a sheet in transportation.

If jamming occurs in the course of a copying operation of the engine under the control of the reader controller, such situation is to be known only in the reader controller. The printer controller is unable to execute a suitable post-process even if such situation is informed, since the jamming is not in the course of operation under the control of the printer controller.

Also, if the printer controller is to be loaded with a control system equivalent to that provided in the reader controller, each of the controllers has to be provided with a jam processing software that is provided in the other controller. Such configuration evidently contains overlapping loading, resulting in a significant waste in the design steps, quality evaluation and software capacity.

Consequently, such situation is to be basically informed to the printer controller in the printing mode and to the reader controller in the copying mode. However, even in the copying mode, the state change signal of engine may be desired by the printer controller. For example, a change in the cassette size or the absence of the recording sheet need to be informed also to the printer controller. However, for such situation, there is not a strict requirement for the time from the issuance of the state change signal in the engine control unit to the process execution in the respective controller.

Therefore, there is adopted a process to be explained in the following. In the copying mode where the engine control unit is controlled by the reader controller, the state change signal/PCCRT informed from the engine control unit is masked, by the gating function of the control circuit 2208, from the printer controller and is solely informed to the reader controller through the interruption controller 2204.

Figure 12:
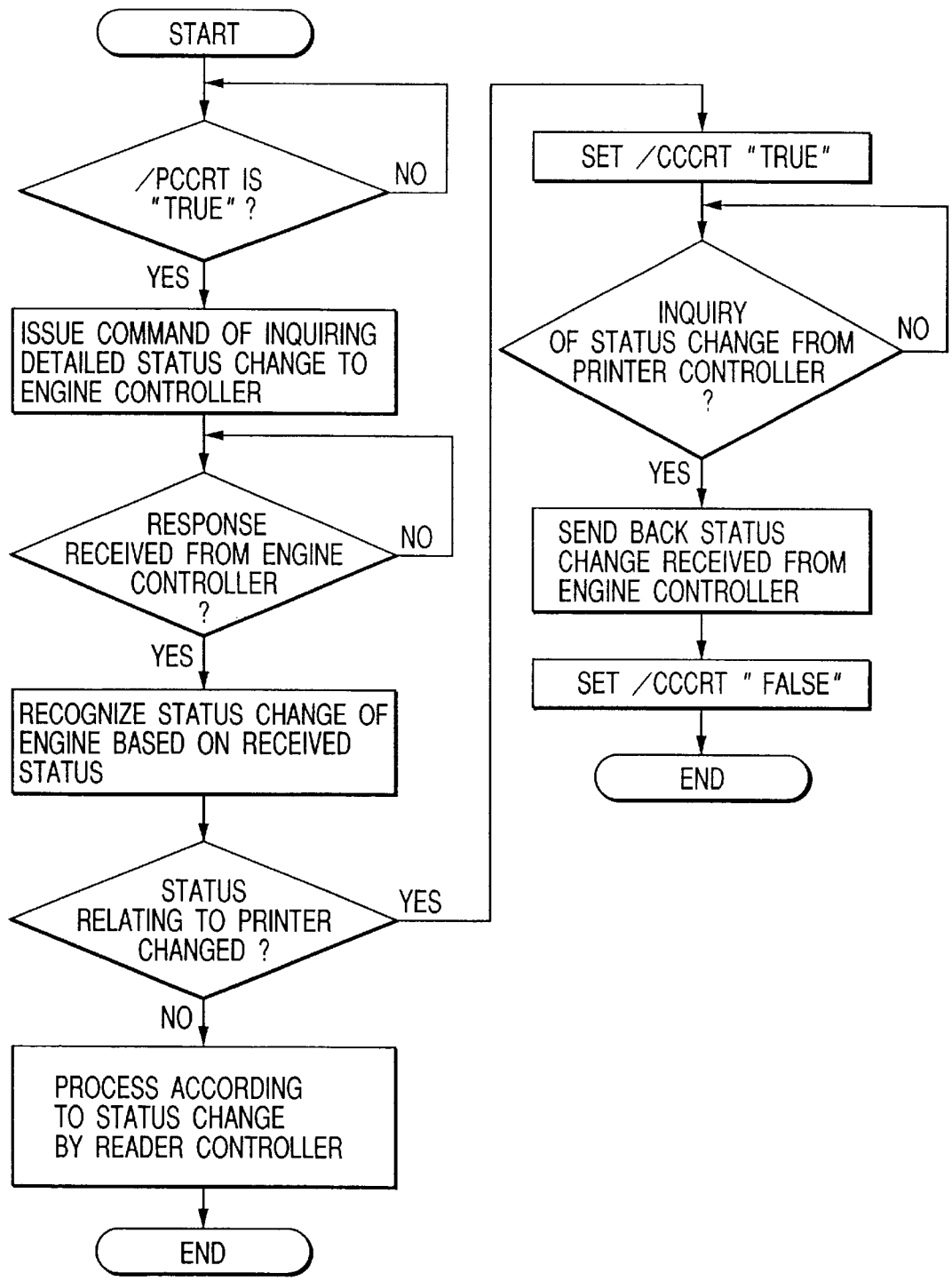
FIG. 12 is a flow chart showing the process for a state change of/CCRT signal in the presence of the reader.

The reader controller executes the control according to the flow shown in FIG. 12. When the /PCCRT signal assumes the true state, the reader controller issues a command, for acquiring the state change, to the engine control unit, then comprehends the content of the state change of the engine by the returned status, and judges whether the content is to be informed also to the printer controller. The state change such as a change in the sheet cassette size is to be informed. In case informing is to be made, the reader controller causes the control circuit 2208 to set a flag and to generate the state change signal /CCCRT thereby informing the printer controller.

In the printing mode in which the engine control unit is controlled by the printer controller, the gating function of the control circuit 2208 is opened whereby the state change signal/PCCRT from the engine control unit is transferred as the state change signal /CCCRT to the printer controller.

Control for Execution Command

In the following there will be explained the control on the execution command. As an example, there will be explained the control by the reader controller in case the printer controller and the reader controller simultaneously issue requests for use to the engine control unit.

Figure 13:
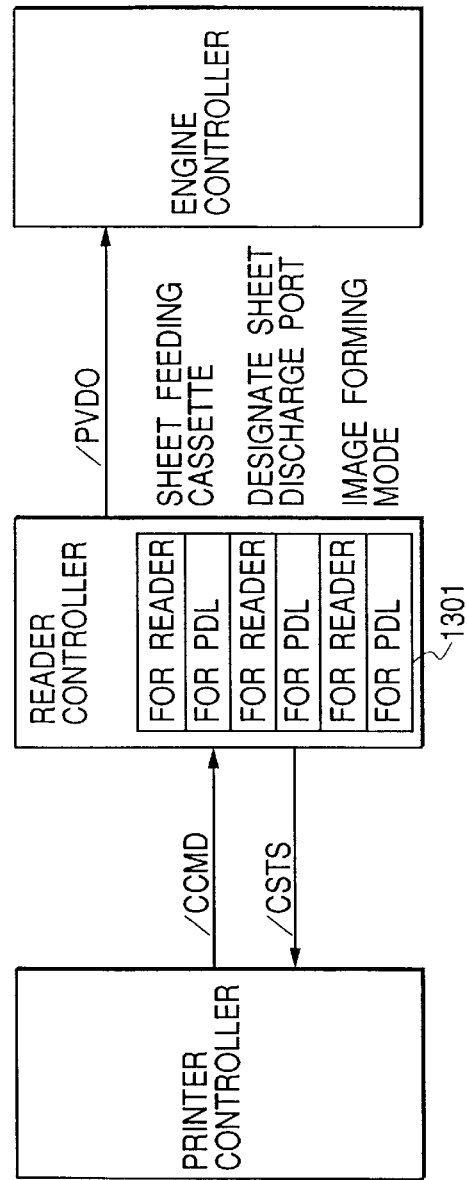
FIG. 13 is a block diagram showing a print request process in the printing operation.

FIG. 13 shows the location of data and exchange there of in case a print request is generated in the course of a printing operation. In this state, the engine control unit is executing the image formation by receiving the image signal/PVDO transferred from the reader controller. In this operation, the settings such as the designation of the sheet cassette, designation of the sheet discharging exit, designation of the image forming mode etc. have already been made by the serial communication between the reader controller and the engine control unit as explained in relation to FIG. 7.

A buffer 1301 for various set values stores various values set in the engine control unit by the reader controller and these set by the printer controller. Among the values set in the buffer 1301. The above-mentioned ones are included in the values for the reader. Now, in case a print request is generated from the printer controller in the course of the copying operation, it is not reasonable, from the standpoint of usability, to execute the printing operation by interrupting the copying operation. Consequently the print request under such situation is postponed until the completion of the copying operation. It is however necessary to return the/CSTS signal in response to the/CCMD signal from the printer controller.

Therefore, the values set from the printer are set according to the request in the buffer 1301, as values for PDL. In case the values for the reader are different from those for PDL, such values may be set in the engine control unit after the completion of the copying operation and prior to the start of the printing operation.

In the following there will be given a specific example.

It is assumed that a copying operation is currently being executed under the settings of sheet being fed from the upper cassette and discharged to the face-up discharging exit, with the color image forming mode based on the judgment that the original is colored. If a print request is generated from the printer controller, the execution of the request itself is postponed but various setting can be made. It is assumed that the print request is to output a monochromatic image with the sheet being fed from the upper cassette and discharge to the face-down discharging exit.

With respect to the sheet feeding cassette, the upper cassette is designated both by the reader controller and the printer controller. Therefore, when the copying operation is completed and is switched to the printing operation, the sheet cassette designating command need not be issued to the engine control unit. However, the sheet discharging exit and the image forming mode are designated differently in the copying operation and the printing operation, so that, at the end of the copying operation, the commands for designating the sheet discharging exit and the image forming mode have to be issued from the reader controller to the engine control unit.

As explained in the foregoing, the reader controller not only execute judgment to postpone the execution, in the engine control unit, of the command from the printer controller but also judgment to avoid overlapped setting of the parameters already set in the engine control unit by the reader controller.

Figure 14:
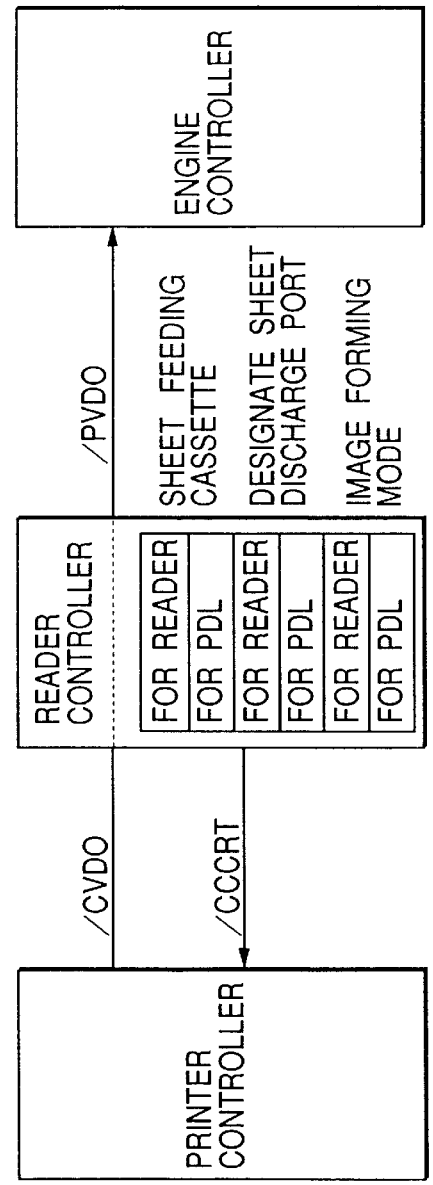
FIG. 14 is a block diagram showing a copy request process in the printing operation.

In the following there will be explained, with reference to FIG. 14, a case of generation of a copy request in the course of a printing operation. In this case, from the standpoint of usability, contrary to the case shown in FIG. 13, the copying operation should preferably be executable by interrupting the printing operation when the copy button is depressed, rather than the copying operation is inhibited by the printing operation in progress.

In this case, the/CVDO signal transferred from the printer controller is selected by the selector 2201 and is transmitted as the/PVDO signal to the engine control unit. The parameters set by the printer controller in this case are assumed as the upper cassette, the face-down discharging exit and the monochromatic image mode, same as in the case shown in FIG. 13. The engine control unit does not know the number of printouts but can only detect the end of the printing operation when the/PPRNT signal from the printer controller assumes the high-level (false) state. It is assumed that the printer is going to print four images. Without the copying request by interruption from the reader controller, the/PTOP signal is generated four times according to the timing shown in FIG. 5, and, according to each of such signals, the image is transferred from the printer controller to the engine control unit through the reader controller.

Figure 15:
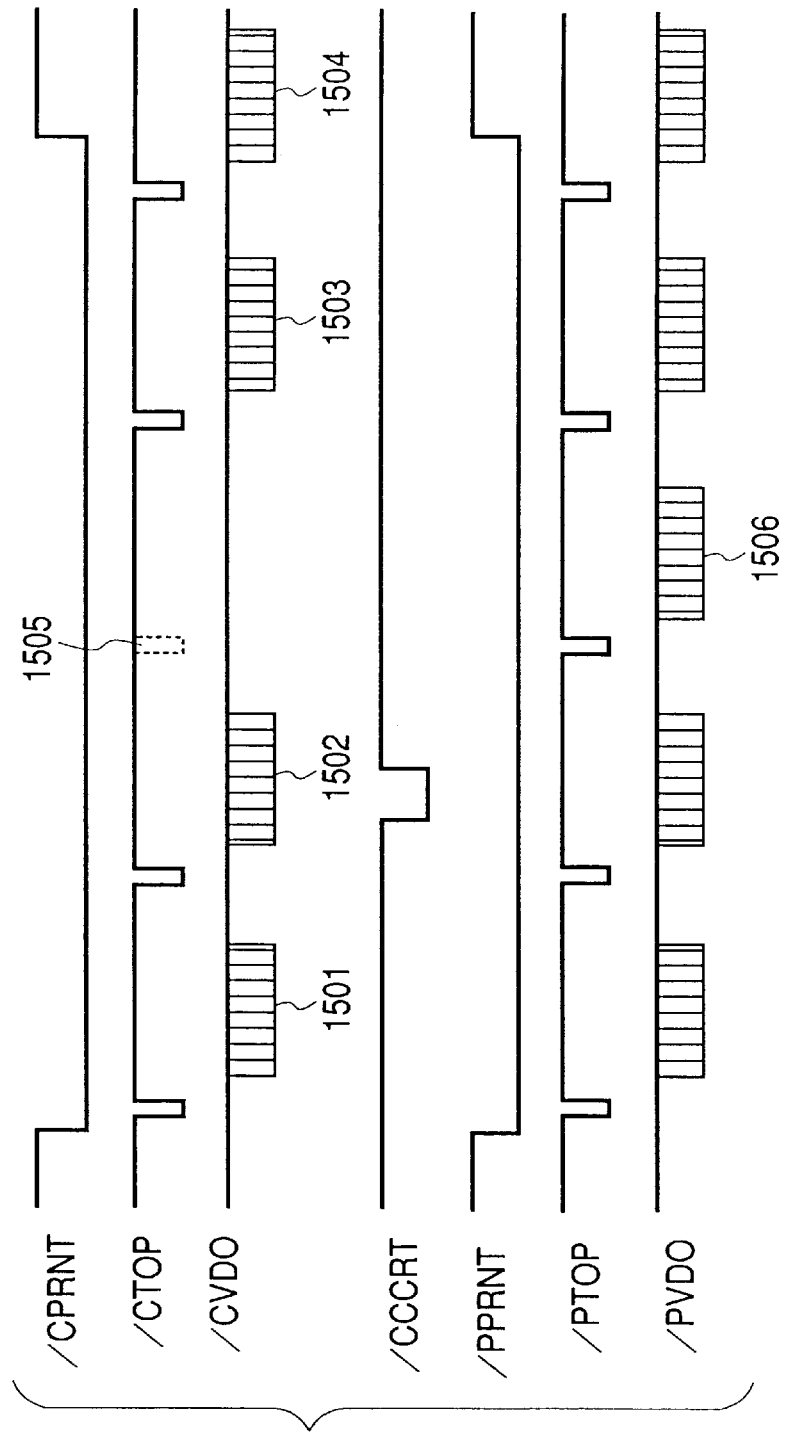
FIG. 15 is a timing chart showing an interruption copying operation.

It is assumed that an interruption copy request for a single copying of a color original is generated from the reader controller in the course of the second printout, and the operation in such case will be explained with reference to FIG. 15. In response to the/CPRNT request signal from the printer controller, the reader controller issues a/PPRNT request signal to the engine control unit. The engine control unit sends the/PTOP signal which is supplied as the/CTOP signal through the reader controller to the printer controller. Thus the first image 1501 and the second image 1502 are printed.

In the following there will be explained a case where the reader controller generates the interruption copy request in the course of the second printout. The reader controller generates the/CCRT signal to the printer controller, not because of an actual status change in the engine but for requesting the printer controller to release the printer engine in order that the reader can acquire the printer engine. The signal generation is executed by the control circuit 2208.

In response to the/CCCRT signal, the printer controller issues a command for checking the status of the engine, and, in response thereto, the reader controller returns a status indicating that "copying operation is in progress" to the printer controller. Thus the printer controller detects that the engine is in the course of the copying operation, and awaits the arrival of the/CTOP signal while maintaining the /CPRNT signal in the low-level (true) state. In case the copying operation is not in progress, a time-out error is judged if the/CTOP signal is not received for a predetermined time while the/CCPRNT signal is in the low-level (true) state, but, in case the copying operation is in progress, the printer controller eliminates such time and awaits the/CTOP signal continuously.

The next/PTOP signal from the engine control unit is for the copying operation and is used by the reader controller. Also as indicated by 1505, the/PTOP signal from the engine is masked to the printer controller. In fact the reader controller generates the image signal 1506 only. After the execution of an interruption copy, the/PTOP signal is again unmasked and transmitted as the/CTOP signal to the printer controller, whereby the images 1503, 1504 from the printer controller can be transferred to and printed in the engine control unit.

In this manner there can be executed the interruption copying operation in the course of the printing operation.

As explained in the foregoing, it is rendered possible to meet the requirements from two controllers with only one engine, by the judgment and control of the reader controller, according to the status of the printer controller and the reader controller, on the acquisition of the printer engine by either of the controllers and the timing of command issuance.

In such case, namely in the above-described case of executing the copying job by interrupting the printing job, the aforementioned charge may be made higher. More specifically, the increment operation of the charging counter may be made different between in the ordinary job and in the interruption job.

Control for Setting Confirmation Command

In the following there will be explained the operation in case the printer controller issues a setting confirmation command.

In a situation where the printer controller wishes to confirm the status set in the engine control unit, the printer controller issues a setting confirmation command by the /CCMD signal. Upon receiving the command, the reader controller checks the buffer for storing the set values shown in FIG. 13, and, if the content to be confirmed by the printer controller is contained in the buffer, the reader controller reads and sends such content to the printer controller by the /CSTS signal. If such content is not contained in the buffer, the reader controller issues a setting confirmation command by the/PCMD signal. The engine control unit reads the content of the command and informs the reader controller of the content of the corresponding setting by the/PSTS signal.

Basic Configuration of Software Counter

In the following there will be explained the configuration of the software counter featuring the present embodiment.

Figure 21:
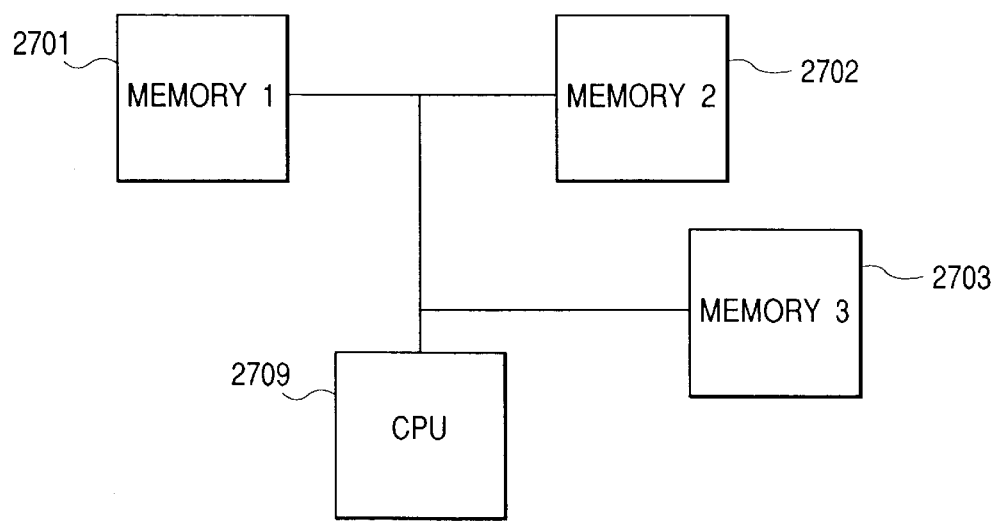
FIG. 21 is a block diagram showing the configuration of a memory for software counter.

FIG. 21 shows the basic configuration of the software counter proposed in the present embodiment. The CPU 2209 controlling the reader controller is provided with a detachable non-volatile memory 1 (2701) and a non-volatile memory 2 (2702) fixed to the apparatus, and these memories constitute a software counter for doubly storing the information. The non-volatile memory mentioned above is capable of retaining the internal information when the power supply of the apparatus is turned off, and is generally composed of a SRAM or an EEPROM with a back-up battery.

For ensuring the stored data, there are preferably provided at least three memories, since, if there are provided only two memories and one of the memories is failed, it may become unable to judge which memory stores the correct data. However since an increase in the number of the memory means complicates the circuit configuration and raises the cost thereof, it is preferable in practice to realize the circuit with the minimum necessary number of memories. In the present embodiment, therefore, a simplified configuration is explained as an example. In the present embodiment, two memory areas for storing the count values are provided in the memory 2 (2702) and are given a same count value at different timings, whereby three memory means are obtained in pseudo manner.

The reader controller records the number of operations in such software counter in the following manner, in outputting the formed images by the engine control unit.

Figure 22B:
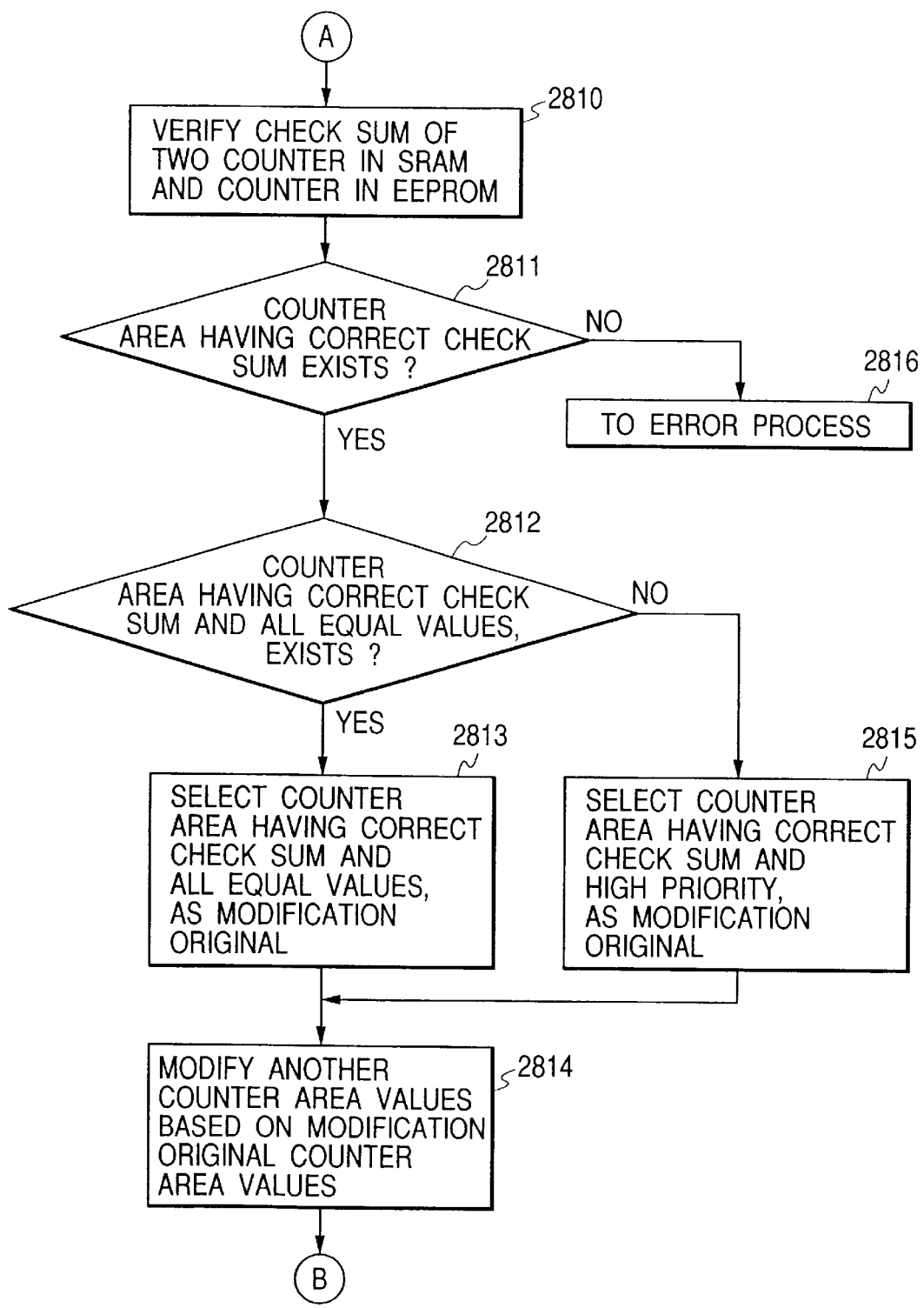
FIG. 22 which is composed of FIGS. 22A and 22B are flow charts for verifying the content of the software counter.

At the count-up timing of the count value, there is executed a control flow shown in FIGS. 22A and 22B. At first the counts in two areas in the memory 2 (2702) are compared with the count in the detachable memory 1 (2701) (step 2801).

The stored content depends on the memory structure and need not necessarily be the count value itself. For example, if the detachable memory means is composed of an EEPROM, the memory area has a limit in the number of re-writing and the stored data may be generated with the management of such number. Also the data stored in the memory 1 (2701) may be made same as the data stored in the EEPROM (managed in consideration of the limit for the number of re-writing) in consideration of ease of comparison. In the following description it is assumed that the data stored in each counter area are identical with the mapping in the memory 1 (2701) composed of an EEPROM, and the memory 2 (2702) is composed of an SRAM.

There is discriminated whether the compared values are all same (2802), and, if same, the count of the area 1 in the memory 2 (2702) is increased, and the check sum in the area 1 is calculated. Subsequently, the count of the memory 1 and that of the area 2 of the memory 2 are increased, and the check sum is calculated and stored in each memory.

In the normal operation, the foregoing operations allow to increase the values of all the counters under a structure of assuring the stored contents.

Method for Correcting the Content Stored in Software Counter

The stored counts may unintentionally change because of influence of noises or because the power supply is turned off in the course of operation of the apparatus. In such case, there is discriminated whether all the compared values are same (2802), and, if not, there is executed a flow for correcting the incorrect count.

At first the check sum values of all the counter areas are verified in order to confirm the incorrect value amount the counter values (2810). If there is no count area with the correct check sum value (2811), there is considered a failure and an error process flow to be explained later is executed. If there is a counter area with the correct check sum value, there is executed a flow for compensating the count value based on such counter area.

There is discriminated whether there is a combination with equal values in the areas, among the counters with equal check sum values (2812), and, if such combination exists, the value of such two counter areas is judges as the correct value (2813). If such combination does not exist, the value of a counter area with the correct check sum value and with a higher priority is judged as the correct value (2815). The order of such priority can be determined in several manners. For example, the priority of the memory 1 (2701) is made higher in consideration of the number of re-writing, or the priority of the area 1 in the memory 2 (2702) in consideration of the order of count-up.

When the count value to be selected as the basis, the values of other counters are corrected according to such basis value (2814).

Method of Compensating Content of Software Counter in Failure

Figure 23:
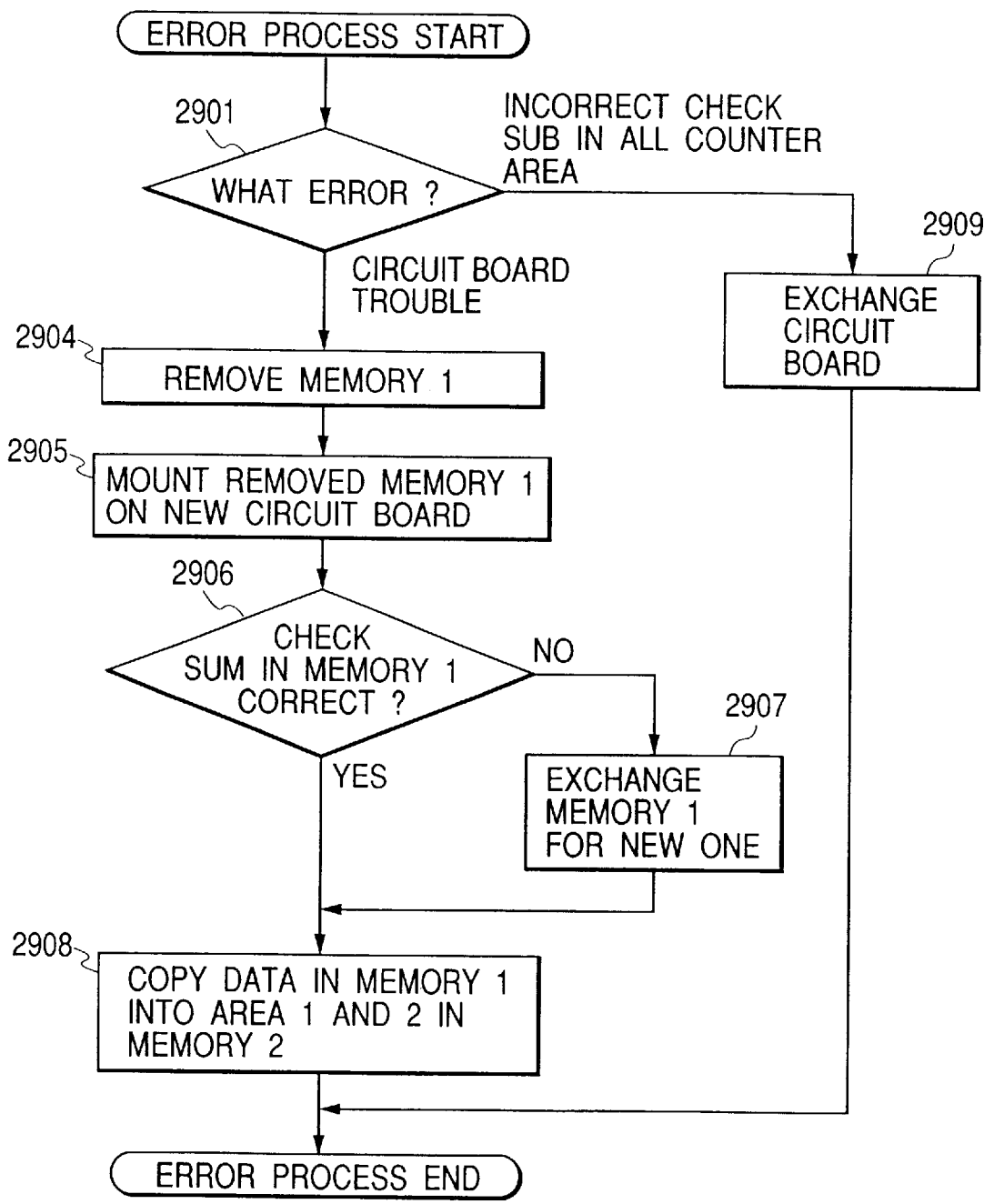
FIG. 23 is a flow chart for correcting the content of the software counter.

A correcting flow shown in FIG. 23 is executed when the verification (2810) of the check sum values of all the counter areas identifies the absence of a counter area with the correct check sum value (2811) or when any failure is judged from the detection of other errors.

As the check sum values of all the counter areas are abnormal, there is judged the details thereof (2901). In the absence of the counter area with the correct check sum value (2811), the circuit board is replaced because both the memories 1 and 2 are probably failed (2909).

In case the failure is not found in the detachable memory 1 (2701) but in the circuit board in which the memories 1 and 2 are provided, the restoration can be achieved while retaining the count values. At first the memory 1 (2701) containing the counts is detached from the board (2904). The failed board is replaced by a proper board, and the detached memory 1 (2701) is mounted again thereon. Then the board is re-activated and there is verified whether the mounted memory 1 (2701) contains a failure (2906). If an error is detected, the memory 1 (2701) is judged to be also failed and is replaced by a new memory. In such case it is not possible to retain the counts.

In case the verification does not show an error in the memory 1 (2701), the data therein are considered correct and are copied to the areas 1 and 2 in the memory 2 (2702) on the new board. Such flow allows to guarantee the counts even in case the circuit board shows a failure and has to be replaced.

The above-mentioned memories may be composed of tamper registers in order to resist attacks to the memories, such as foregoing of the content.

The system consisting of the functional blocks shown in the foregoing drawings may be constituted by a hardware or by a microcomputer system including a CPU, memories etc. In case of the configuration of such computer system, the above-mentioned memories constitute the memory medium in the present invention. Such memory medium stores a program for executing the process sequence for controlling the operations explained with respect to the foregoing flow charts.

The memory medium storing such program codes can be, for example, a semiconductor memory such as ROM or RAM, an optical disk, a magnetooptical disk, a magnetic medium etc. which can be constructed as a CD-ROM, a floppy disk, another magnetic medium, a magnetic card, a non-volatile memory card etc.

The functions and effects equivalent to those in the foregoing embodiments can be realized to achieve the objects of the present invention, also by applying the above-mentioned memory medium in a system or an apparatus other than the systems shown in the foregoing drawings and by reading and executing program codes stored in the memory medium by such system or a computer therein.

Furthermore, the functions and effects equivalent to those in the foregoing embodiment can be realized to attain the objects of the present invention also in a case where an operating system functioning on the computer executes all the process or a part thereof, or in a case where the program codes program codes are once stored in a memory provided in a function expansion board inserted into the computer or in a function expansion unit connected to the computer, and a CPU or the like provided in the function expansion board or the function expansion unit executes all the process or a part thereof according to the instructions of such program codes.

As explained in the foregoing, the embodiments of the present invention allow to realize a highly reliable software counter, capable of correcting the count or transferring the count to another circuit board even in case of a failure, by providing plural memory means, including detachable one, capable of storing plural count values.

What is claimed is:

1. A counting apparatus comprising:
   execution detection means for detecting execution of a predetermined operation;
   plural memory means for commonly storing, at each detection by said execution detection means, information on a number of detected executions;
   degradation detection means for detecting, when the information on a number of detected executions is stored, whether information stored in each of said plural memory means is degraded; and
   correction means for correcting, when said degradation detecting means detects that information in any of said plural memory means is degraded, the degraded information with information from at least one of others of said plural memory means,
   wherein, when the at least one of the others of said plural memory means has a rewrite limit number, the at least one of the others of said plural memory means is selected at least in part based on the rewrite limit number.

2. A counting apparatus according to claim 1, further comprising memory control means for causing, after said correction means corrects the degraded information, each of said plural memory means to store the information on a number of detected executions modified by one.

3. A counting apparatus according to claim 1, wherein at least one of said plural memory means is detachable and retains the stored information on a number of detected executions when the at least one of said plural memory means is in an attached state and a detached state.

4. A counting apparatus according to claim 1, wherein said correction means uses base information to correct the information on a number of detected executions stored in the memory means in which information is degraded.

5. The counting apparatus according to claim 1, wherein the predetermined operation is an operation that outputs an image formed in an image forming apparatus.

6. A method of counting, comprising the steps of:
   detecting execution of a predetermined operation;
   storing, commonly in plural memory means and at each detection by said execution detection step, information on a number of detected executions;
   detecting, when the information on a number of detected executions is stored, whether information stored in each of the plural memory means is degraded; and
   correcting, when said degradation detecting step detects that information in any of the plural memory means is degraded, the degraded information with information from at least one of others of the plural memory means,
   wherein, when the at least one of the others of the plural memory means has a rewrite limit number, the at least one of the others of the plural memory means is selected at least in part based on the rewrite limit number.

7. A computer readable storage medium storing a program for executing a method of counting, the method comprising the steps of:
   detecting execution of a predetermined operation;
   storing, commonly in plural memory means and at each detection by said execution detection step, information on a number of detected executions;
   detecting, when the information on a number of detected executions is stored, whether information stored in each of the plural memory means is degraded; and
   correcting, when said degradation detecting step detects that information in any of the plural memory means is degraded, the degraded information with information from at least one of others of the plural memory means,
   wherein, when the at least one of the others of the plural memory means has a rewrite limit number, the at least one of the others of the plural memory means is selected at least in part based on the rewrite limit number.

* * * * *